(12) United States Patent
Dines

(10) Patent No.: US 11,507,259 B2
(45) Date of Patent: *Nov. 22, 2022

(54) GRAPHICAL ELEMENT DETECTION USING A COMBINED SERIES AND DELAYED PARALLEL EXECUTION UNIFIED TARGET TECHNIQUE, A DEFAULT GRAPHICAL ELEMENT DETECTION TECHNIQUE, OR BOTH

(71) Applicant: UiPath, Inc., New York, NY (US)

(72) Inventor: Daniel Dines, New York, NY (US)

(73) Assignee: UiPath, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,171

(22) Filed: Sep. 8, 2020

(65) Prior Publication Data

US 2022/0075508 A1  Mar. 10, 2022

(51) Int. Cl.
*G06F 3/0484* (2022.01)
*G06F 3/04842* (2022.01)

(52) U.S. Cl.
CPC ................ *G06F 3/04842* (2013.01)

(58) Field of Classification Search
CPC ..... G06F 3/04842; G06F 3/0484; G06F 3/048
See application file for complete search history.

(56) References Cited

U.S. PATENT DOCUMENTS

| | | | | |
|---|---|---|---|---|
| 6,115,646 A | * | 9/2000 | Fiszman | G06Q 10/10 |
| | | | | 700/104 |
| 7,418,615 B2 | * | 8/2008 | Chang | G06F 13/102 |
| | | | | 713/400 |
| 7,437,614 B2 | * | 10/2008 | Haswell | G06F 11/3684 |
| | | | | 714/38.13 |

(Continued)

FOREIGN PATENT DOCUMENTS

| | | | |
|---|---|---|---|
| KR | 20070057646 A | 6/2007 | |
| KR | 20200082801 A | 7/2020 | |

(Continued)

OTHER PUBLICATIONS

UiPath Tutorial (see https://dev.tutorialspoint.com/uipath/uipath_tutorial.pdf; pub date: 2018) (Year: 2018).*

(Continued)

*Primary Examiner* — Jung-Mu T Chuang
(74) *Attorney, Agent, or Firm* — LeonardPatel PC; Michael A. Leonard, II; Sheetal S. Patel

(57) ABSTRACT

Graphical element detection using a combined series and delayed parallel execution unified target technique that potentially uses a plurality of graphical element detection techniques, performs default user interface (UI) element detection technique configuration at the application and/or UI type level, or both, is disclosed. The unified target merges multiple techniques of identifying and automating UI elements into a single cohesive approach. A unified target descriptor chains together multiple types of UI descriptors in series, uses them in parallel, or uses at least one technique first for a period of time and then runs at least one other technique in parallel or alternatively if the first technique does not find a match within the time period.

20 Claims, 20 Drawing Sheets

(56) References Cited

U.S. PATENT DOCUMENTS

| | | | |
|---|---|---|---|
| 7,653,873 B2 | 1/2010 | Brandt et al. | |
| 7,653,896 B2* | 1/2010 | Herdeg, III | G06F 11/3414 |
| | | | 717/113 |
| 7,671,796 B2* | 3/2010 | Chen | G01S 19/28 |
| | | | 342/357.48 |
| 8,170,901 B2* | 5/2012 | Shukla | G06Q 10/0631 |
| | | | 705/7.27 |
| 8,190,536 B2* | 5/2012 | Al-Duwaish | G06F 16/24532 |
| | | | 706/10 |
| 8,332,443 B2* | 12/2012 | Plancarte | G06F 9/4843 |
| | | | 718/100 |
| 8,356,207 B2* | 1/2013 | Hosek | G07C 3/00 |
| | | | 714/26 |
| 8,385,658 B2* | 2/2013 | Elangovan | H04N 5/265 |
| | | | 382/216 |
| 8,407,661 B2 | 3/2013 | Wang et al. | |
| 8,554,600 B2* | 10/2013 | Reisman | G06Q 30/0631 |
| | | | 705/7.29 |
| 8,701,090 B2* | 4/2014 | Zavatone | G06F 11/3692 |
| | | | 717/124 |
| 8,707,280 B2* | 4/2014 | Stefansson | G06F 8/314 |
| | | | 717/149 |
| 8,756,044 B2* | 6/2014 | Mani | G06F 8/10 |
| | | | 703/13 |
| 8,843,492 B2* | 9/2014 | Cao | G06F 16/215 |
| | | | 707/737 |
| 8,855,372 B2* | 10/2014 | Rodriguez | G06K 9/6201 |
| | | | 382/103 |
| 8,898,442 B2* | 11/2014 | Stoitsev | G06F 8/10 |
| | | | 712/244 |
| 8,917,275 B2* | 12/2014 | Grieves | G09G 5/14 |
| | | | 345/467 |
| 8,954,419 B2* | 2/2015 | Apte | G06F 15/16 |
| | | | 707/718 |
| 9,021,442 B2* | 4/2015 | Rossi | G06F 11/3664 |
| | | | 717/125 |
| 9,164,776 B2* | 10/2015 | Rauh | G06F 16/80 |
| 9,195,572 B2* | 11/2015 | Rossi | G06F 16/955 |
| 9,274,934 B2* | 3/2016 | Chandra | G06F 11/3688 |
| 9,335,920 B2* | 5/2016 | Ohashi | H04N 21/4622 |
| 9,424,167 B2* | 8/2016 | Lee | G06F 3/04842 |
| 9,465,726 B2* | 10/2016 | Kozhuharov | G06F 11/3696 |
| 9,501,537 B2* | 11/2016 | Walter | H04W 52/027 |
| 9,519,570 B2* | 12/2016 | Srinivasan | G06F 11/3664 |
| 9,594,367 B2 | 3/2017 | D'Mura et al. | |
| 9,600,401 B1* | 3/2017 | Haischt | G06F 11/3664 |
| 9,760,475 B2* | 9/2017 | Zhang | G06F 11/3688 |
| 9,817,746 B2* | 11/2017 | Li | G06F 11/3664 |
| 9,817,967 B1* | 11/2017 | Shukla | G06F 21/52 |
| 9,836,775 B2* | 12/2017 | He | G06Q 30/0625 |
| 9,928,106 B2* | 3/2018 | Hosabettu | G06F 9/4843 |
| 9,965,139 B2* | 5/2018 | Nychis | G06F 3/04842 |
| 10,042,638 B2 | 8/2018 | Busi et al. | |
| 10,088,969 B2* | 10/2018 | Schein | G06F 9/45512 |
| 10,146,785 B2* | 12/2018 | Desineni | G06F 16/1748 |
| 10,169,006 B2* | 1/2019 | Kochura | G06F 9/451 |
| 10,180,896 B2* | 1/2019 | Spycher | G06F 11/3664 |
| 10,191,889 B2* | 1/2019 | Nguyen | G06F 40/103 |
| 10,261,658 B2* | 4/2019 | Zhang | G06F 8/34 |
| 10,270,644 B1 | 4/2019 | Valsecchi et al. | |
| 10,339,027 B2* | 7/2019 | Garcia | G06F 11/3409 |
| 10,354,225 B2* | 7/2019 | Sharma | G06F 9/451 |
| 10,409,712 B2* | 9/2019 | Dwarakanath | G06F 11/3664 |
| 10,430,180 B2 | 10/2019 | Kakhandiki et al. | |
| 10,503,627 B2* | 12/2019 | Radhakrishnan | G06F 11/0787 |
| 10,575,231 B2* | 2/2020 | Gay | H04W 36/18 |
| 10,654,166 B1* | 5/2020 | Hall | G06F 9/4843 |
| 10,659,247 B2 | 5/2020 | Glaser et al. | |
| 10,705,948 B2* | 7/2020 | Ramasamy | G06F 11/3644 |
| 10,733,329 B1* | 8/2020 | Ragupathy | G06F 21/45 |
| 10,754,493 B2 | 8/2020 | Nychis et al. | |
| 10,812,272 B1* | 10/2020 | Copeland | H04L 9/0866 |
| 10,853,097 B1* | 12/2020 | Kakhandiki | G05B 19/4155 |
| 10,860,905 B1* | 12/2020 | Gligan | G06F 16/93 |
| 10,908,950 B1* | 2/2021 | Dennis | G06F 9/4881 |
| 10,911,546 B1* | 2/2021 | Goswami | G06F 9/452 |
| 2003/0050800 A1 | 3/2003 | Brandt et al. | |
| 2003/0126517 A1 | 7/2003 | Givoni et al. | |
| 2003/0191559 A1 | 10/2003 | Chatsinchai et al. | |
| 2004/0041827 A1* | 3/2004 | Bischof | G06F 11/3688 |
| | | | 715/704 |
| 2004/0194065 A1* | 9/2004 | McGrath | G06F 9/44 |
| | | | 717/124 |
| 2004/0255269 A1 | 12/2004 | Santori et al. | |
| 2005/0132045 A1 | 6/2005 | Hornback et al. | |
| 2005/0182667 A1 | 8/2005 | Metzger et al. | |
| 2006/0005132 A1* | 1/2006 | Herdeg, III | G06F 11/3414 |
| | | | 715/704 |
| 2006/0074730 A1* | 4/2006 | Shukla | G06Q 10/0633 |
| | | | 705/7.27 |
| 2006/0199167 A1* | 9/2006 | Yang | G06F 30/20 |
| | | | 434/365 |
| 2007/0074062 A1* | 3/2007 | Chang | G06F 13/102 |
| | | | 713/502 |
| 2007/0150805 A1 | 6/2007 | Misovski | |
| 2007/0229352 A1* | 10/2007 | Chen | G01S 19/28 |
| | | | 342/357.67 |
| 2009/0028440 A1* | 1/2009 | Elangovan | G06T 7/248 |
| | | | 382/216 |
| 2009/0103769 A1 | 4/2009 | Milov et al. | |
| 2009/0167493 A1* | 7/2009 | Colciago | G06V 20/52 |
| | | | 348/E5.022 |
| 2010/0023141 A1 | 1/2010 | Wang et al. | |
| 2010/0063946 A1* | 3/2010 | Al-Duwaish | G06F 16/24532 |
| | | | 706/10 |
| 2010/0076600 A1* | 3/2010 | Cross | H04N 7/15 |
| | | | 700/259 |
| 2010/0088396 A1* | 4/2010 | Armerding | H04L 49/253 |
| | | | 709/218 |
| 2010/0121794 A1 | 5/2010 | Heisele et al. | |
| 2010/0205529 A1* | 8/2010 | Butin | G06F 8/38 |
| | | | 715/704 |
| 2011/0035406 A1* | 2/2011 | Petrou | G06F 16/438 |
| | | | 707/769 |
| 2011/0078652 A1* | 3/2011 | Mani | G06F 8/10 |
| | | | 717/105 |
| 2011/0173590 A1* | 7/2011 | Yanes | G06F 11/3664 |
| | | | 717/125 |
| 2011/0239141 A1* | 9/2011 | Wang | G06F 9/451 |
| | | | 715/763 |
| 2011/0252356 A1 | 10/2011 | Morris | |
| 2011/0304641 A1* | 12/2011 | Grieves | G09G 5/14 |
| | | | 345/590 |
| 2012/0023484 A1* | 1/2012 | Demant | G06F 8/38 |
| | | | 717/125 |
| 2012/0102461 A1* | 4/2012 | Schwartz | G06F 9/45512 |
| | | | 717/124 |
| 2012/0117456 A1 | 5/2012 | Koskimies | |
| 2012/0124495 A1* | 5/2012 | Amichai | G06F 11/3684 |
| | | | 715/762 |
| 2012/0167016 A1* | 6/2012 | Rauh | G06F 9/451 |
| | | | 715/854 |
| 2012/0174069 A1* | 7/2012 | Zavatone | G06F 11/3692 |
| | | | 717/124 |
| 2012/0317165 A1* | 12/2012 | Stefansson | G06F 8/314 |
| | | | 709/201 |
| 2013/0019170 A1* | 1/2013 | Mounty | G06F 11/3688 |
| | | | 715/704 |
| 2013/0159890 A1* | 6/2013 | Rossi | G06F 16/95 |
| | | | 715/762 |
| 2013/0318068 A1* | 11/2013 | Apte | G06F 15/16 |
| | | | 707/718 |
| 2014/0149391 A1* | 5/2014 | Walter | G06F 16/248 |
| | | | 707/722 |
| 2014/0281918 A1 | 9/2014 | Wei et al. | |
| 2014/0297818 A1* | 10/2014 | Loewenthal | H04L 61/2015 |
| | | | 709/221 |
| 2014/0351091 A1* | 11/2014 | He | G06Q 30/0625 |
| | | | 705/26.62 |

(56) References Cited

U.S. PATENT DOCUMENTS

| | | | |
|---|---|---|---|
| 2014/0366005 A1* | 12/2014 | Kozhuharov | G06F 11/3664 717/125 |
| 2015/0020191 A1 | 1/2015 | Vida et al. | |
| 2015/0290795 A1 | 10/2015 | Oleynik | |
| 2015/0310446 A1 | 10/2015 | Tuchman et al. | |
| 2015/0317240 A1* | 11/2015 | Li | G06F 11/3664 714/38.1 |
| 2015/0339213 A1 | 11/2015 | Lee et al. | |
| 2015/0370694 A1* | 12/2015 | Zhang | G06F 11/3688 717/124 |
| 2016/0019049 A1 | 1/2016 | Kakhandiki et al. | |
| 2016/0171285 A1 | 6/2016 | Kim et al. | |
| 2016/0179359 A1 | 6/2016 | Kodejs et al. | |
| 2016/0292015 A1 | 10/2016 | Shah et al. | |
| 2016/0335349 A1* | 11/2016 | Desineni | G06F 16/951 |
| 2016/0335356 A1 | 11/2016 | Desineni et al. | |
| 2017/0001308 A1* | 1/2017 | Bataller | G05B 19/0423 |
| 2017/0052824 A1* | 2/2017 | Sharma | G06F 9/4494 |
| 2017/0060368 A1* | 3/2017 | Kochura | G06F 9/451 |
| 2017/0147296 A1* | 5/2017 | Kumar | G06F 8/34 |
| 2017/0173784 A1* | 6/2017 | Shah | B25J 9/0084 |
| 2017/0228119 A1* | 8/2017 | Hosbettu | G06Q 10/00 |
| 2017/0295243 A1* | 10/2017 | Kim | H04L 67/38 |
| 2018/0103047 A1* | 4/2018 | Turgeman | H04L 63/08 |
| 2018/0146157 A1 | 5/2018 | Karpinsky | |
| 2018/0173614 A1 | 6/2018 | Gong et al. | |
| 2018/0189170 A1 | 7/2018 | Dwarakanath et al. | |
| 2018/0197123 A1 | 7/2018 | Parimelazhagan et al. | |
| 2018/0307592 A1 | 10/2018 | Topholt et al. | |
| 2018/0370029 A1 | 12/2018 | Hall et al. | |
| 2018/0370033 A1* | 12/2018 | Geffen | G06F 11/07 |
| 2019/0015974 A1* | 1/2019 | Mummigatti | G06F 16/951 |
| 2019/0050323 A1 | 2/2019 | Kogan et al. | |
| 2019/0129827 A1* | 5/2019 | Ramasamy | G06F 11/3668 |
| 2019/0141596 A1* | 5/2019 | Gay | H04W 36/026 |
| 2019/0155225 A1* | 5/2019 | Kothandaraman | G06N 20/00 |
| 2019/0205636 A1 | 7/2019 | Saraswat et al. | |
| 2019/0266254 A1* | 8/2019 | Blumenfeld | G06Q 40/08 |
| 2019/0286474 A1 | 9/2019 | Sturtivant | |
| 2019/0286736 A1* | 9/2019 | Sturtivant | G06F 16/2358 |
| 2019/0302968 A1 | 10/2019 | Nychis et al. | |
| 2019/0332508 A1* | 10/2019 | Goyal | G06F 11/008 |
| 2019/0340114 A1 | 11/2019 | Podoler | |
| 2019/0347313 A1 | 11/2019 | Walsh et al. | |
| 2020/0004798 A1 | 1/2020 | Weinert, Jr. et al. | |
| 2020/0026263 A1* | 1/2020 | Haberkern | H04L 41/5022 |
| 2020/0050983 A1* | 2/2020 | Balasu | G06F 11/3423 |
| 2020/0059441 A1 | 2/2020 | Viet et al. | |
| 2020/0073686 A1* | 3/2020 | Hanke | G06F 11/368 |
| 2020/0134374 A1* | 4/2020 | Oros | G06F 8/71 |
| 2020/0134524 A1 | 4/2020 | Gentilhomme et al. | |
| 2020/0180155 A1 | 6/2020 | Hall | |
| 2020/0206920 A1 | 7/2020 | Ma et al. | |
| 2020/0219033 A1 | 7/2020 | Smutko et al. | |
| 2020/0225848 A1 | 7/2020 | Yoon et al. | |
| 2020/0226249 A1 | 7/2020 | Zhan et al. | |
| 2020/0234183 A1 | 7/2020 | Ghatage et al. | |
| 2020/0249964 A1* | 8/2020 | Fernandes | G06F 11/3409 |
| 2020/0310844 A1* | 10/2020 | Dennis | G06F 9/45512 |
| 2020/0334136 A1* | 10/2020 | Ramasamy | G06F 11/366 |
| 2020/0371818 A1* | 11/2020 | Ban | G06F 40/20 |
| 2020/0379889 A1* | 12/2020 | Hamid | G06F 11/3664 |
| 2020/0401430 A1* | 12/2020 | Berg | G06F 3/0482 |
| 2021/0012102 A1* | 1/2021 | Cristescu | G06F 16/56 |
| 2021/0019157 A1 | 1/2021 | Voicu | |
| 2021/0019574 A1* | 1/2021 | Voicu | G06K 9/6263 |
| 2021/0051203 A1* | 2/2021 | Sathianarayanan | H04L 69/40 |
| 2021/0109722 A1 | 4/2021 | Ripa | |
| 2021/0117162 A1 | 4/2021 | Thangaraj et al. | |
| 2021/0125189 A1 | 4/2021 | P et al. | |
| 2021/0133670 A1 | 5/2021 | Cella et al. | |
| 2021/0182996 A1 | 6/2021 | Cella et al. | |
| 2021/0200387 A1 | 7/2021 | Munteanu | |
| 2021/0248514 A1 | 8/2021 | Cella et al. | |

FOREIGN PATENT DOCUMENTS

| | | |
|---|---|---|
| WO | 2015125017 A2 | 8/2015 |
| WO | 2020106437 A1 | 5/2020 |

OTHER PUBLICATIONS

Microsoft Active Accessibility Wikipedia Page available at https://en.wikipedia.org/wiki/Microsoft_Active_Accessibility (last accessed Aug. 26, 2020).

UiPath February Monthly Update available at https://www.uipath.com/blog/february-2020-uipath-monthly-update (Feb. 24, 2020).

Jung-Mu T Chuang, "Non-Final Office Action", dated Jun. 2, 2021, U.S. Appl. No. 17/016,251.

Ui Path Community Forum (see "https://forum.uipath.com/t/multiple-instances-of-design-studio/32137"; pub date: 2018; downloaded on May 26, 2021) (Year: 2018).

UiPath Studio Guide (https://docs.uipath.com/studio/v2018 4/docs/introduction; pub date: 2018) (Year: 2018).

"About the UiAutomationNext Activities Pack," available at URL:https://web.archive.org/web/20200804053432/https://docs.uipath.com/activities/docs/about-the-ui-automation-next-activities-pack (Aug. 4, 2020).

European Search Report issued in EP Application No. 20199241 dated Mar. 15, 2021.

European Search Report issued in EP Application No. 20199254 dated Mar. 16, 2021.

International Search Report & Written Opinion, dated Apr. 29, 2021, PCT Application No. PCT/US20/51481.

Param Kahlon, "UiPath Feb. 2020 Monthly Update," available at https://www.uipath.com/blog/february-2020-uipath-monthly-update (Feb. 24, 2020).

Param Kahlon, "UiPath Mar. 2020 Monthly Update," available at https://www.uipath.com/blog/march-2020-uipath-monthly-update (Mar. 23, 2020).

UiAutomationNext Project Settings Page available at https://web.archive.org/web/20200804053904/https://docs.uipath.com/activities/docs/project-settings-ui-automation-next (Aug. 4, 2020).

International Search Report and Written Opinion of the International Search Authority issued for PCT Application No. PCT/US2020/051468 dated Jun. 7, 2021.

Jung-Mu T Chuang, "Notice of Allowance", dated Jan. 5, 2022, U.S. Appl. No. 17/331,558.

Jung-Mu T Chuang, "Notice of Allowance", dated Jan. 5, 2022, U.S. Appl. No. 17/332,005.

International Search Report & Written Opinion, dated Dec. 6, 2021, PCT Application No. PCT/US21/45966.

International Search Report & Written Opinion, dated Dec. 8, 2021, PCT Application No. PCT/US21/45974.

Tapani Qvick. Understanding Business Process Complexity for Robotic Process Automation. Lappeenranta University of Technology, Master's Thesis, Jan. 21, 2019, See pp. 45-46.

Notice of Allowance issued in Korean Application No. 10-2020-7028263 dated Mar. 29, 2022.

MicroFocus RPA Architecture page available at https://docs.microfocus.com/doc/Robotic_Process_Automation/2019.07/RPAArch (Jul. 18, 2019).

David S. Posigian, "Non-Final Office Action", dated Mar. 24, 2022, U.S. Appl. No. 17/332,005.

* cited by examiner

| Targeting Methods – Web | ⌄ |
| Targeting Methods – Java | ⌄ |
| Targeting Methods – SAP | ⌄ |
| Targeting Methods – Desktop (UIA) | ⌄ |
| Targeting Methods – Desktop (AA) | ⌄ |
| Targeting Methods – Desktop (Win32) | ⌄ |

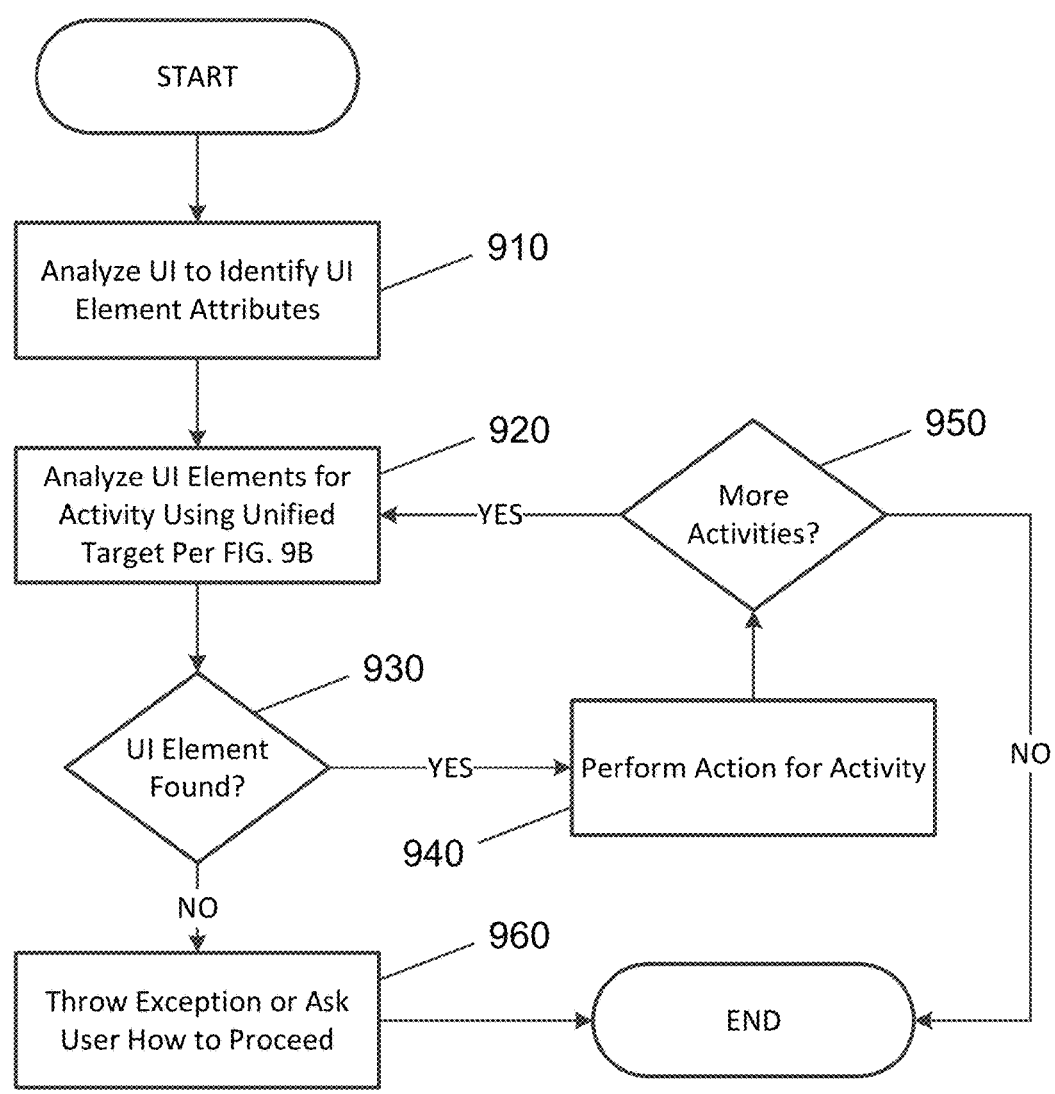

GRAPHICAL ELEMENT DETECTION USING A COMBINED SERIES AND DELAYED PARALLEL EXECUTION UNIFIED TARGET TECHNIQUE, A DEFAULT GRAPHICAL ELEMENT DETECTION TECHNIQUE, OR BOTH

FIELD

The present invention generally relates to graphical element detection, and more specifically, to graphical element detection using a combined series and delayed parallel execution unified target technique, performing default UI element detection technique configuration at the application and/or UI type level, or both.

BACKGROUND

For robotic process automation (RPA) in a UI, graphical element detection may be performed using selectors, computer vision (CV), or optical character recognition (OCR) for each UI action. However, these techniques are typically applied individually and are not optimal for all scenarios. Accordingly, an improved approach may be beneficial.

SUMMARY

Certain embodiments of the present invention may provide solutions to the problems and needs in the art that have not yet been fully identified, appreciated, or solved by current graphical element detection technologies. For example, some embodiments of the present invention pertain to graphical element detection using a combined series and delayed parallel execution unified target technique. Certain embodiments pertain to default UI element detection technique configuration at the application and/or UI type level. This configuration may then be used to detect UI elements at runtime.

In an embodiment, a computer-implemented method for detecting graphical elements in a UI includes receiving, by a designer application, a selection of an activity in an RPA workflow to be configured to perform graphical element detection using a unified target technique. The computer-implemented method also includes receiving, by the designer application, modifications to the unified target technique for the activity and configuring the activity based on the modifications, by the designer application. The unified target technique is a combined series and delayed parallel execution unified target technique that is configured to employ a plurality of graphical element detection techniques.

In another embodiment, a computer program is embodied on a non-transitory computer-readable medium. The computer program is configured to cause at least one processor to analyze a UI at runtime to identify UI element attributes and compare the UI element attributes to UI descriptor attributes for an activity of an RPA workflow using one or more initial graphical element detection techniques. When a match is not found using the one or more initial graphical element detection techniques during a first time period, the computer program is configured to cause the at least one processor to execute one or more additional graphical element detection techniques in parallel with the one or more initial graphical element detection techniques.

In yet another embodiment, a computer program is embodied on a non-transitory computer-readable medium. The computer program is configured to cause at least one processor to analyze a UI at runtime to identify UI element attributes and compare the UI element attributes to UI descriptor attributes for an activity of an RPA workflow using one or more initial graphical element detection techniques. When a match is not found using the one or more initial graphical element detection techniques during a first time period, the computer program is configured to cause the at least one processor to execute one or more additional graphical element detection techniques instead of the one or more initial graphical element detection techniques.

In still another embodiment, a computer-implemented method for detecting graphical elements in a UI includes receiving, by an RPA designer application, a selection of an application or a UI type. The computer-implemented method also includes receiving and saving a default targeting method settings configuration, by the RPA designer application. The computer-implemented method further includes receiving an indication of a screen to be automated, by the RPA designer application. The screen pertains to the selected application or UI type. Additionally, the computer-implemented method includes automatically preconfiguring the default targeting method settings for the selected application or UI type, by the RPA designer application.

In another embodiment, a computer program is embodied on a non-transitory computer-readable medium. The computer program is configured to cause at least one processor to automatically preconfigure default targeting method settings for a selected application or UI type. The computer program is also configured to cause the at least one processor to receive modifications to the default targeting method settings for the application or the UI type and configure the default targeting method settings in accordance with the modifications. The computer program is further configured to cause the at least one processor to configure one or more activities in an RPA workflow using the default targeting method settings for the application or UI type.

In yet another embodiment, a computer program is embodied on a non-transitory computer-readable medium. The computer program is configured to cause at least one processor to automatically preconfigure default targeting method settings for an application or UI type, by a designer application and configure one or more activities in an RPA workflow using the default targeting method settings for the application or UI type. The computer program is also configured to cause the at least one processor to generate an RPA robot to implement the RPA workflow including the one or more configured activities.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 7A-C illustrate a targeting method configuration interface for configuring targeting methods at the application and/or UI type level, according to an embodiment of the present invention.

FIGS. 9A and 9B are flowcharts illustrating a process for graphical element detection using a combined series and delayed parallel execution unified target technique, according to an embodiment of the present invention.

Unless otherwise indicated, similar reference characters denote corresponding features consistently throughout the attached drawings.

DETAILED DESCRIPTION OF THE EMBODIMENTS

Figure 1:
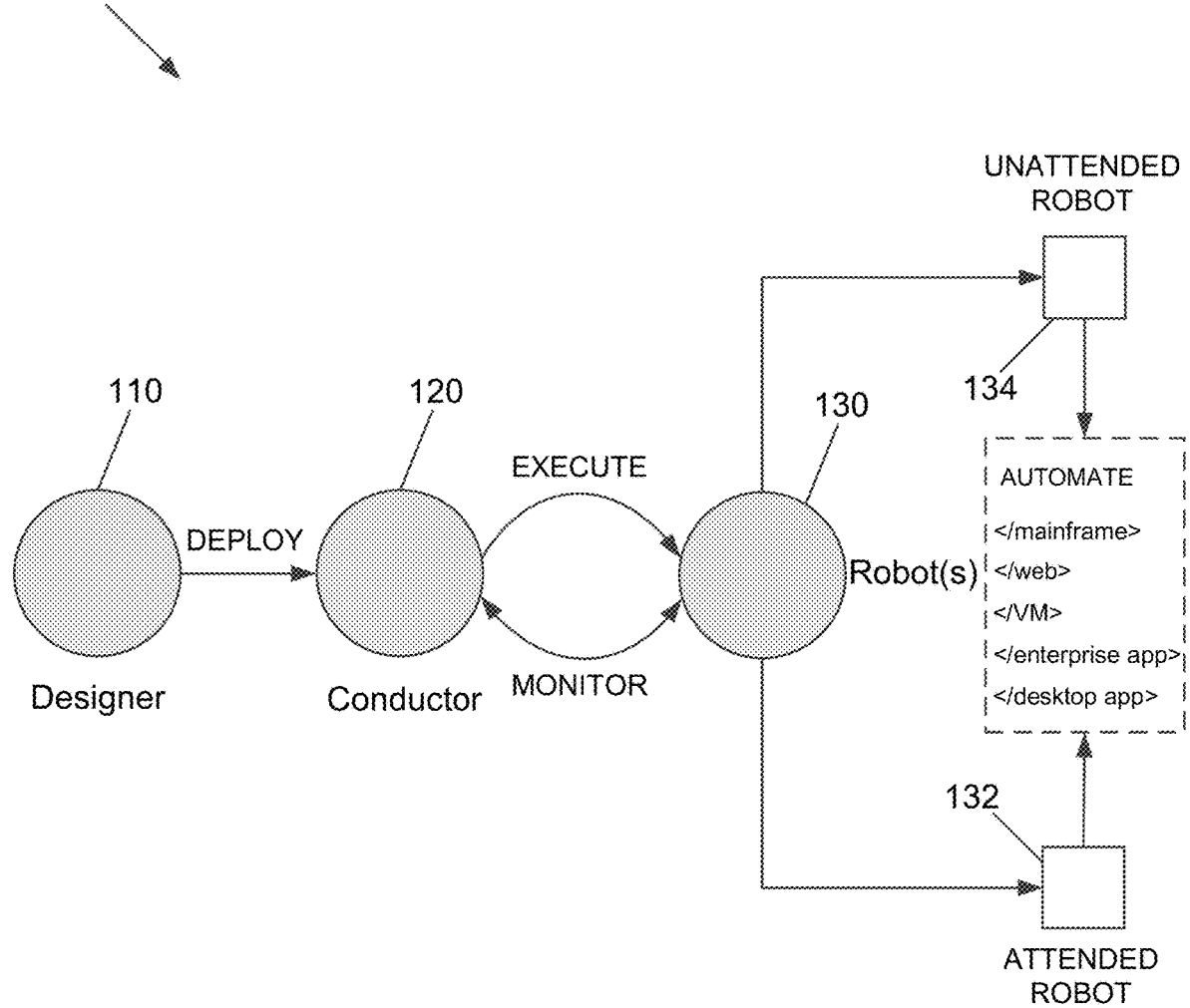
FIG. 1 is an architectural diagram illustrating a robotic process automation (RPA) system, according to an embodiment of the present invention.

Some embodiments pertain to graphical element detection using a combined series and delayed parallel execution unified target technique that potentially uses a plurality of graphical element detection techniques (e.g., selectors, CV, OCR, etc.). "Graphical elements" and "UI elements" are used interchangeably herein. At their core, UI descriptors identify the UI elements (e.g., text fields, buttons, labels, menus, checkboxes, etc.). Some types of UI descriptors include, but are not limited to, selectors, CV descriptors, image matching descriptors, OCR descriptors, unified target descriptors that may utilize multiple different types of UI descriptors in series or in parallel, etc. UI descriptors may be used to compare attributes for a given UI descriptor with attributes of UI elements found at runtime in the UI.

In some embodiments, UI descriptors store the attributes of the respective UI element and its parents, e.g., in an Extensible Markup Language (XML) fragment. At runtime, the attributes for the UI elements found in the UI can be searched for matches with attributes for a respective RPA workflow activity, and if an exact match or a "close enough" match is found within a matching threshold, the UI element may be identified and interacted with accordingly. The attributes may include text-based identifiers (IDs), classes, roles, and the like. For CV, the attributes may include the type of the target element and the relation to one or more anchor elements that may be used in a multi-anchor matching approach. For OCR, the attributes may include text in the form of a stored string, for example, and text found via OCR to which the stored string was fuzzy matched during execution. Any suitable attributes and graphical element detection techniques may be used without deviating from the scope of the invention.

As used herein, a "screen" is an image of an application UI or a portion of the application UI at a certain point in time. In some embodiments, UI elements and screens may be further differentiated into specific types of UI elements (e.g., buttons, checkboxes, text fields, etc.) and screens (e.g., top windows, modal windows, popup windows, etc.).

Some embodiments use UI descriptors that store the attributes of a UI element and its parents in an XML fragment. In modern computing systems, the operating system typically represents each user interface as a hierarchical data structure that is commonly referred to as a UI tree. An example UI tree may include a document object model (DOM) underlying a webpage rendered by a web browser application.

Selectors are a type to UI descriptor that may be used to detect UI elements in some embodiments. A selector has the following structure in some embodiments:

<node_1/><node_2/> . . . <node_N/>

The last node represents the GUI element of interest, and all previous nodes represent the parents of that element. <node_1> is usually referred to as a root node, and represents the top window of the application.

Each node may have one or more attributes that assist with correct identification of a specific level of the selected application. Each node has the following format in some embodiments:

<ui_system attr_name_1='attr_value_1' . . . attr_name_N='attr_value_N'/>

Every attribute may have an assigned value, and attributes with constant values may be selected. This is because changes to the value of an attribute each time the application is started may lead to the selector not being able to correctly identify the associated element.

A UI descriptor is a set of instructions for finding a UI element. UI descriptors in some embodiments are an encapsulated data/struct format that includes UI element selector(s), anchor selector(s), CV descriptor(s), OCR descriptor(s), unified target descriptor(s) combining two or more types of UI descriptors, a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention. UI descriptors may be extracted from activities in an RPA workflow and added to a structured schema that groups the UI descriptors by UI applications, screens, and UI elements.

The UI descriptors may work with a unified target that encompasses multiple or all UI element detection mechanisms through which image detection and definition are performed in some embodiments. The unified target may merge multiple techniques of identifying and automating UI elements into a single cohesive approach. A unified target descriptor chains together multiple types of UI descriptors in series, uses them in parallel, or uses at least one technique (e.g., a selector) first for a period of time and then runs at least one other technique in parallel or alternatively if the first technique does not find a match within the time period. In some embodiments, a unified target descriptor may function like a finite state machine (FSM), where in a first context, a first UI descriptor mechanism is applied, in a second context, a second UI descriptor is applied, etc. The unified target may prioritize selector-based and driver-based UI detection mechanisms and fall back on CV, image matching, and/or other mechanisms to find a graphical element if the first two mechanisms are not successful in some embodiments.

In some embodiments, fuzzy matching may be employed, where one or more attributes should match with a certain accuracy (e.g., a 70% match, an 80% match, a 99% match, etc.), within a certain range, using string metrics (e.g., a Levenshtein distance, a Hamming distance, a Jaro-Winkler distance, etc.), a combination thereof, etc. One of ordinary skill in the art will appreciate that the similarity measure may quantify an amount of similarity, as well as an amount of mismatch between two attribute values. Furthermore, in various embodiments, the similarity threshold may represent a maximum amount of mismatch or a minimum amount of similarity required for a match.

Depending on the chosen manner of computing the similarity measure, the similarity threshold can have various interpretations. For instance, the similarity threshold may indicate a maximum count of characters that can differ between the two strings or a fractional degree of mismatch calculated as a proportion of the total count of characters (e.g., combined string length). In some embodiments, the similarity threshold may be re-scaled to a predetermined interval, such as between 0 and 1, between 0 and 100, between 7 and 34, etc. In one nonlimiting example, a relatively high similarity threshold (e.g., close to 1 or 100%) indicates a requirement for an almost exact match, i.e., the value of the fuzzy attribute in the runtime target is only allowed to depart very slightly from the value of the respective attribute in the design time target. In contrast, when the similarity threshold is relatively low (e.g., close to 0), almost any values of the respective fuzzy attribute are considered as matching.

In certain embodiments, the matching tolerance may differ on a per-attribute basis. For instance, an exact match may be required for one or more attributes (e.g., it may be desired to find a certain exact name) and fuzzy matching may be performed for one or more other attributes. The number and/or type of attributes used from each graphical element detection technique may be custom-specified by the RPA developer in some embodiments.

In some embodiments, attributes may be stored as attribute-value pairs and/or attribute-value-tolerance pairs (e.g., fuzzy matching). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

These attribute-value pairs and/or attribute-value-tolerance pairs may be stored in a tag in some embodiments, and each tag may include a sequence of characters with the sequence book-ended by implementation-specific delimiters (e.g., beginning with "<" and ending with "/>"). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

To enable a successful and ideally unambiguous identification by an RPA robot, some embodiments represent each UI element using an element ID characterizing the respective UI element. The element ID in some embodiments indicates a location of a target node within a UI tree, where the target node represents the respective UI element. For instance, the element ID may identify a target node/UI element as a member of a selected subset of nodes. The selected subset of nodes may form a genealogy, i.e., a line of descent through the UI tree where each node is either an ancestor or a descendant of another node.

In some embodiments, the element ID includes an ordered sequence of node indicators, the sequence tracing a genealogical path through the UI tree, and the path ending in the respective target node/UI element. Each node indicator may represent a member of an object hierarchy of the respective UI and its position within the sequence consistent with the respective hierarchy. For instance, each member of the sequence may represent a descendant (e.g., a child node) of the previous member, and may have the following member as a descendant (e.g., a child node). In one HyperText Markup Language (HTML) example, an element ID representing an individual form field may indicate that the respective form field is a child of an HTML form, which in turn is a child of a specific section of a webpage, etc. The genealogy does not need to be complete in some embodiments.

Some embodiments may use one or more multi-anchor matching attributes. Anchors are other UI elements that can be used to assist in uniquely identifying a target UI element. For instance, if multiple text fields are included in a UI, searching for a text field alone is insufficient to uniquely identify a given text field. Accordingly, some embodiments look for additional information in order to uniquely identify a given UI element. Using the text field example, a text field for entering a first name may appear to the right of the label "First Name". This first name label may be set as an "anchor" to help to uniquely identify the text field, which is the "target".

Various positional and/or geometric associations between the target and the anchor may be used in some embodiments, potentially within one or more tolerances, to uniquely identify the target. For instance, the center of bounding boxes for the anchor and the target may be used to define a line segment. This line segment could then be required to have a certain length within a tolerance and/or slope within a tolerance to uniquely identify the target using the target/anchor pair. However, any desired position of the location associated with the target and/or anchors may be used in some embodiments without deviating from the scope of the invention. For instance, the point for drawing line segments may be in the center, upper left corner, upper right corner, lower left corner, lower right corner, any other location on the border of the bounding box, any location within the bounding box, a location outside of the bounding box as identified in relation to the bounding box properties, etc. In certain embodiments, the target and one or more anchors may have different locations within or outside of their bounding boxes that are used for geometric matching.

Per the above, a single anchor may not always be sufficient to uniquely identify a target element on a screen with a certain confidence. For instance, consider a web form where two text field for entering a first name appear to the right of respective labels "First Name" in different locations on the screen. In this example, one or more additional anchors may be useful to uniquely identify a given target. The geometric properties between the anchors and the target (e.g., line segment lengths, angles, and/or relative locations with tolerances) may be used to uniquely identify the target.

The user may be required to continue to add anchors until a match strength for the target exceeds the threshold.

As used herein, the terms "user" and "developer" are used interchangeably. The user/developer may or may not have programming and/or technical knowledge. For instance, in some embodiments, the user/developer may create RPA workflows by configuring activities in the RPA workflow without manual coding. In certain embodiments, this may be done by clicking and dragging and dropping various features, for example.

In some embodiments, default UI element detection techniques (also called "targeting methods" herein) may be configured at the application and/or UI type level. UI element detection techniques that work well for a given application and/or UI type may not work as well for another application and/or UI type. For instance, techniques that work well for a Java® window may not work as well for a web browser window. Accordingly, the user may configure the RPA robot to use the most effective technique(s) for the given application and/or UI type.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
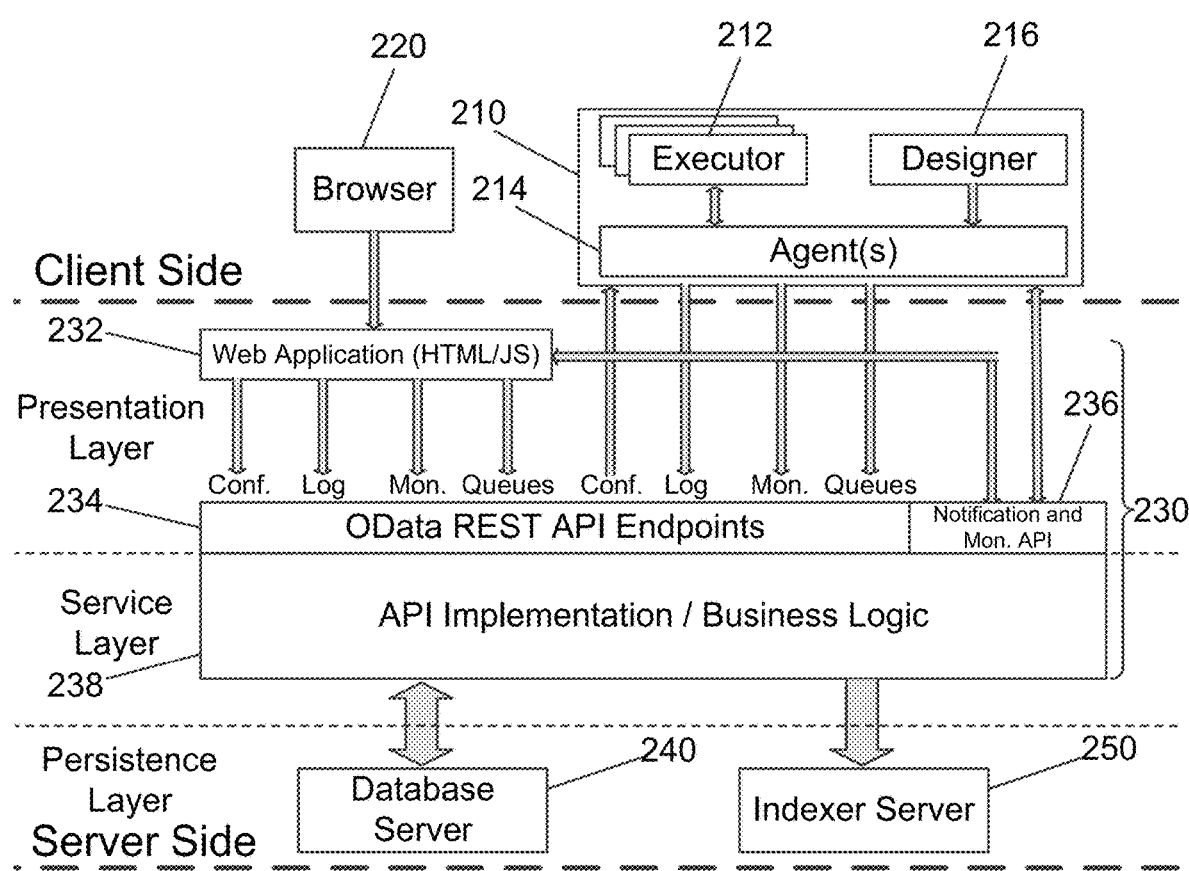
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
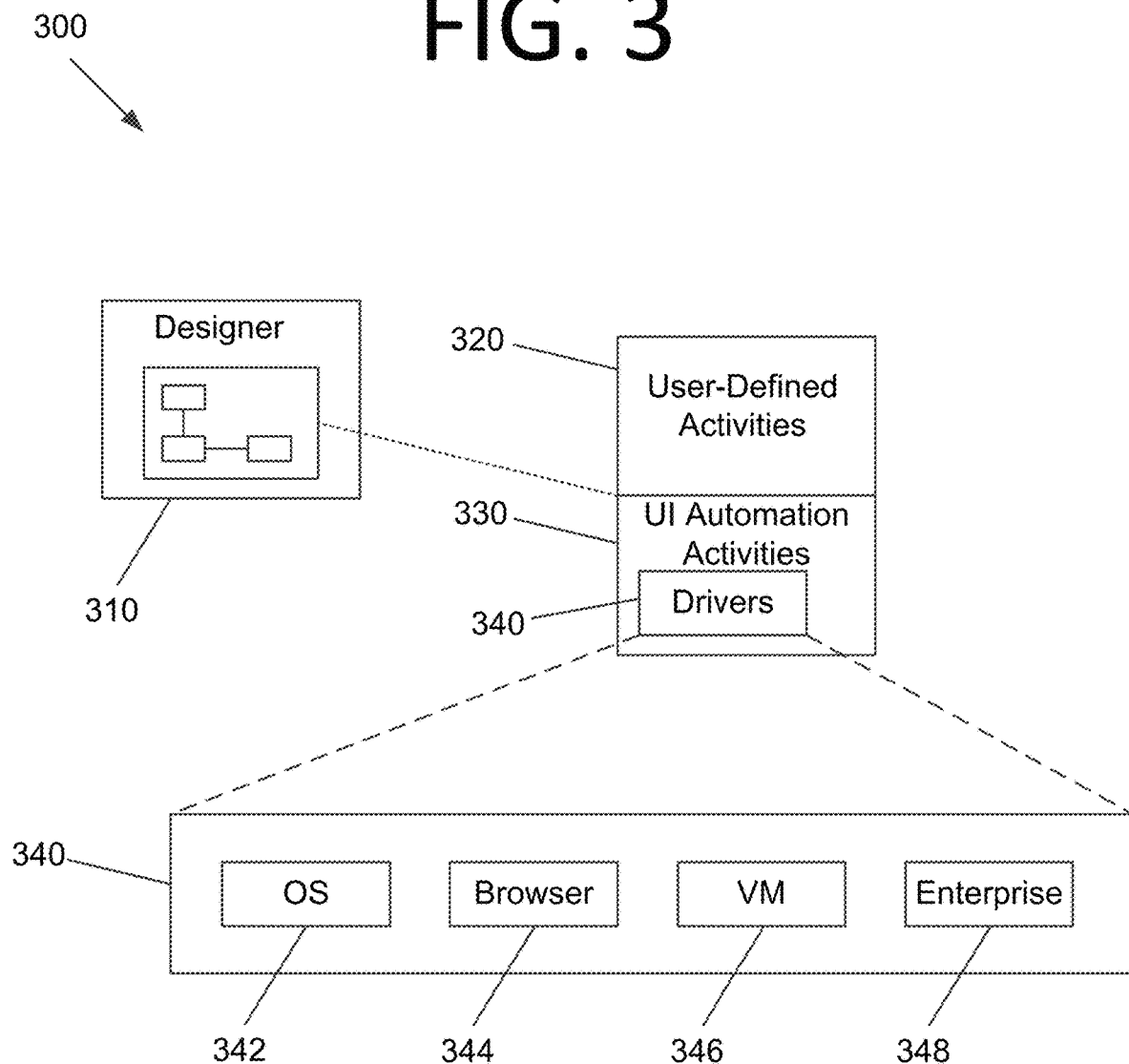
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
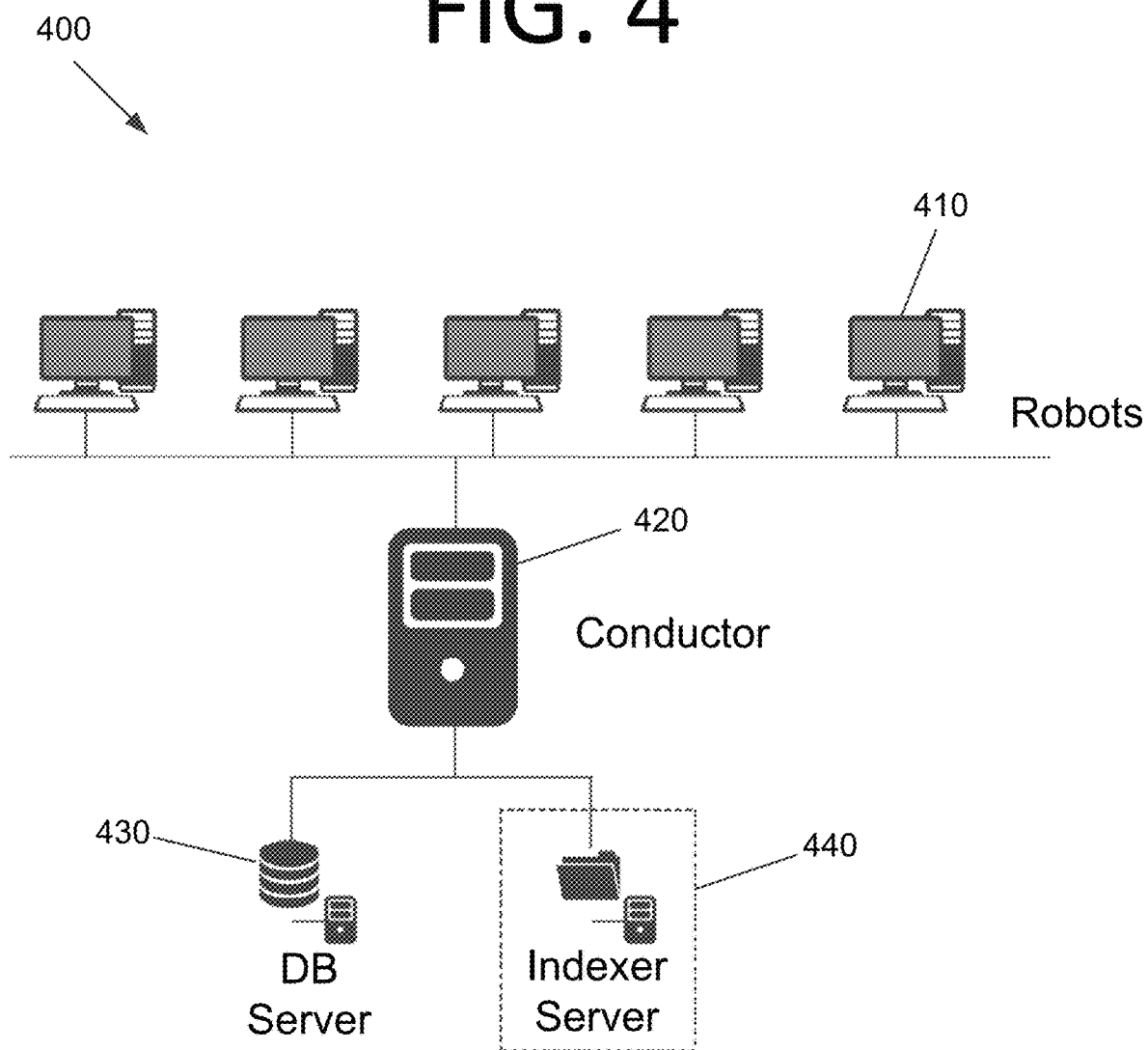
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

Figure 5:
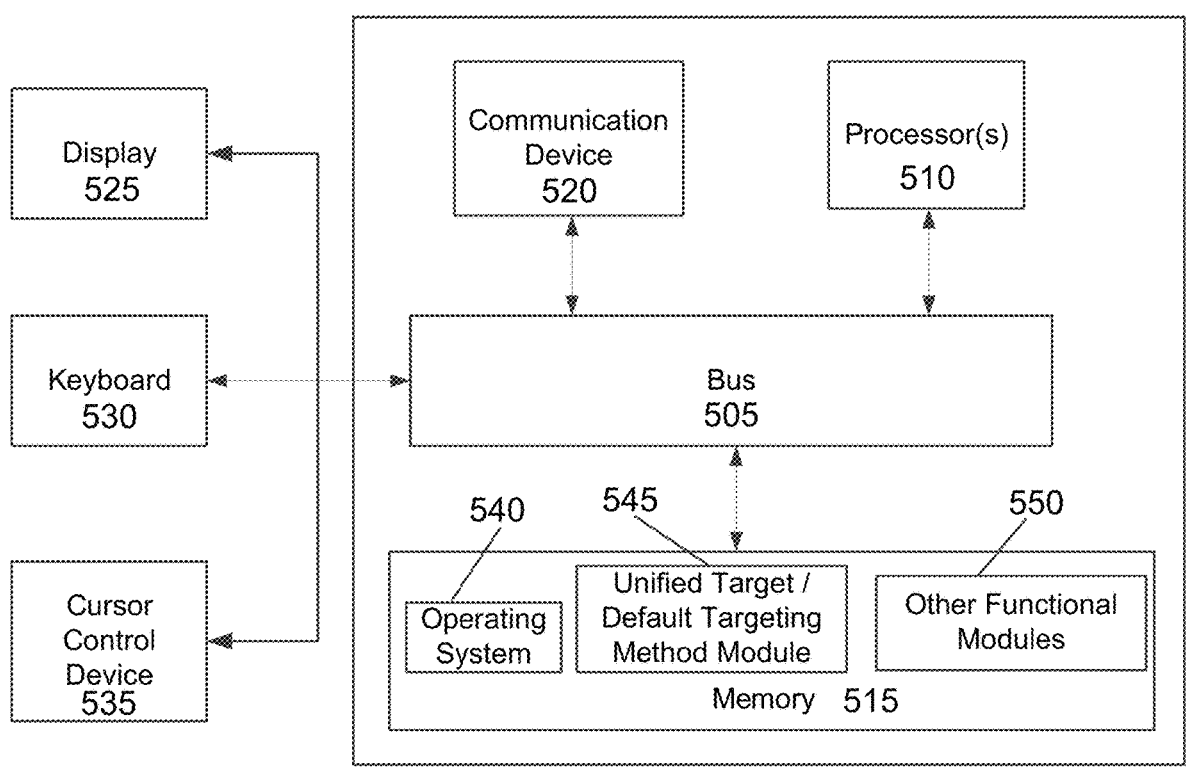
FIG. 5 is an architectural diagram illustrating a computing system configured to perform graphical element detection using a combined series and delayed parallel execution unified target technique and/or one or more default targeting methods configured by application or UI type, according to an embodiment of the present invention.

FIG. 5 is an architectural diagram illustrating a computing system 500 configured to perform graphical element detection using a combined series and delayed parallel execution unified target technique and/or one or more default targeting methods configured by application or UI type, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a combined series-and-parallel unified target/default targeting method module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIGS. 6A-G illustrate a unified target configuration interface for an RPA designer application 600, according to an embodiment of the present invention. In this embodiment, the RPA developer can custom-configure the unified target functionality for activities in the RPA workflow. RPA designer application 600 includes an RPA workflow development pane 610 with a click activity 612. RPA designer application 600 also includes a unified target configuration pane 620. When a user clicks an activity that interacts with a graphical element in a UI, unified target configuration pane 620 shows unified target options for that activity.

Figure 6A:
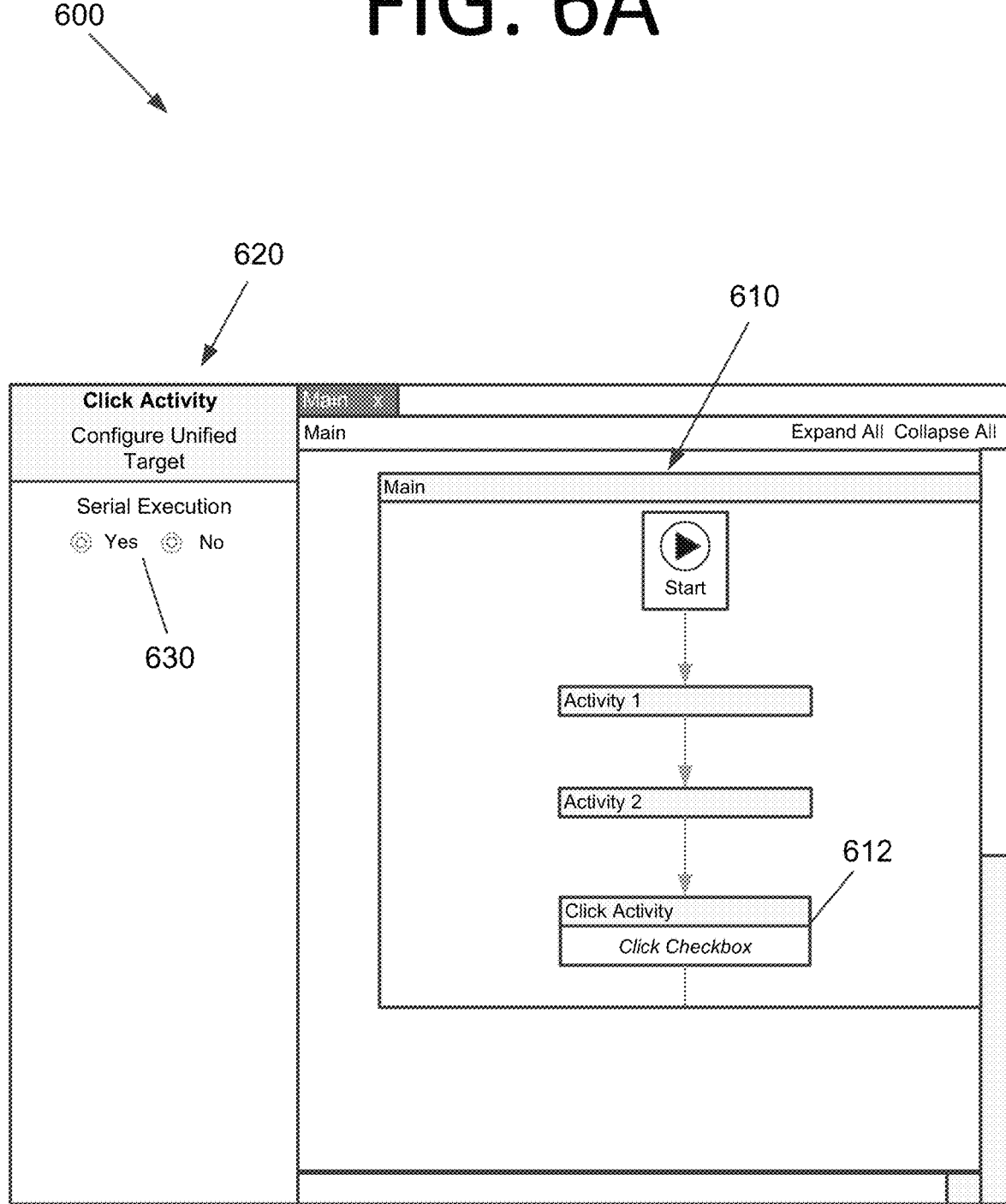
FIGS. 6A-G illustrate a unified target configuration interface for an RPA designer application, according to an embodiment of the present invention.
Figure 6B:
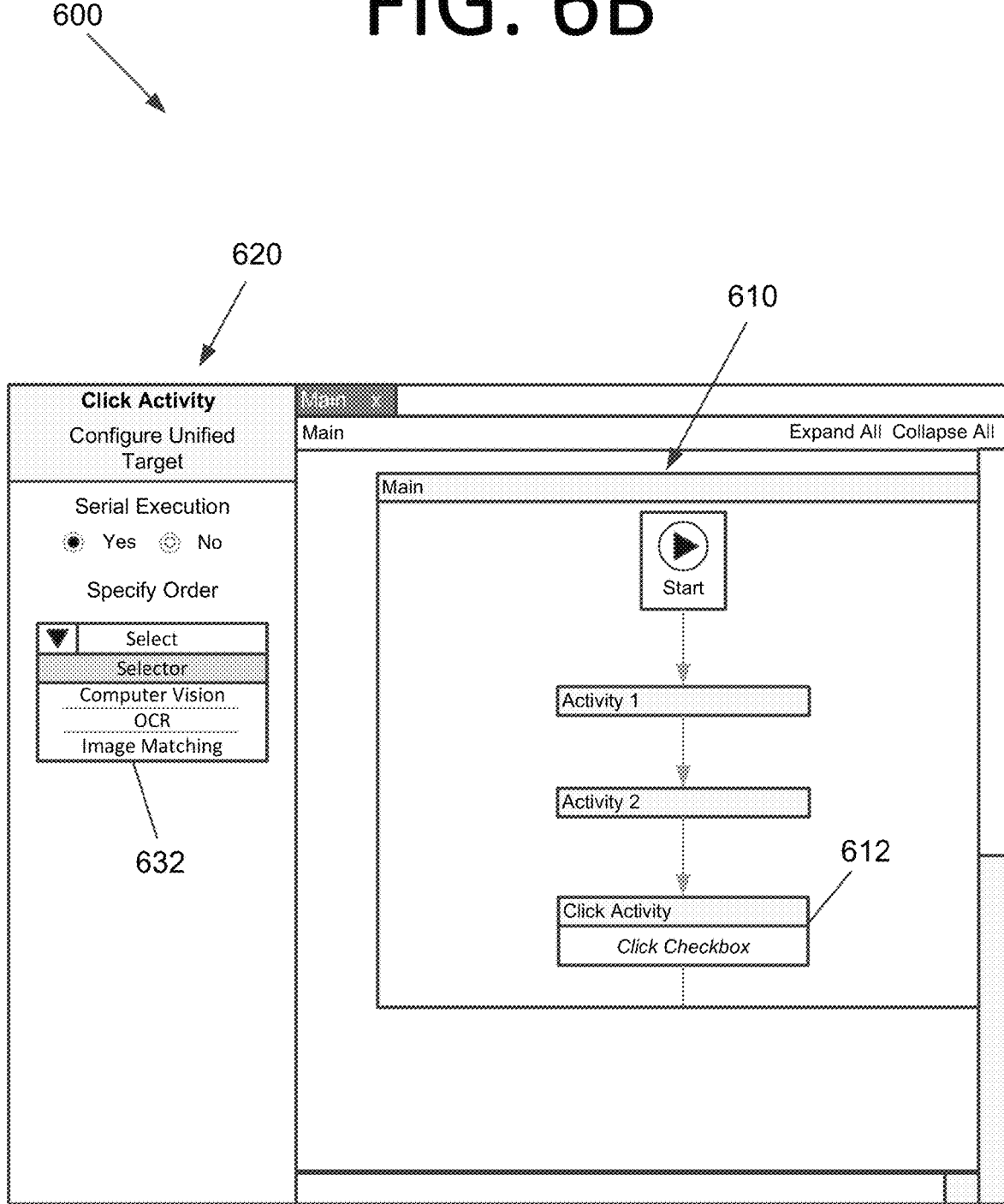
Figure 6C:
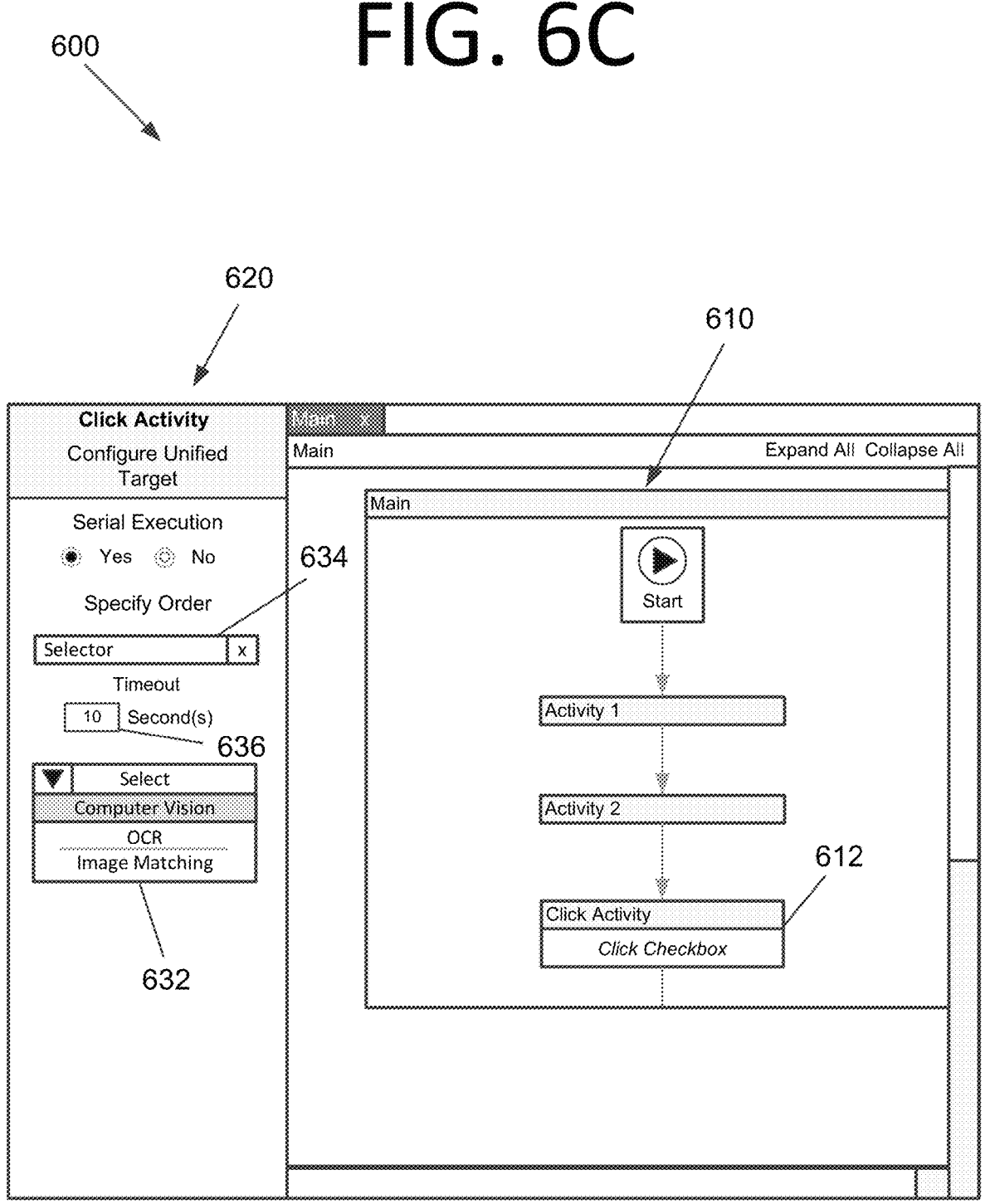
Figure 6D:
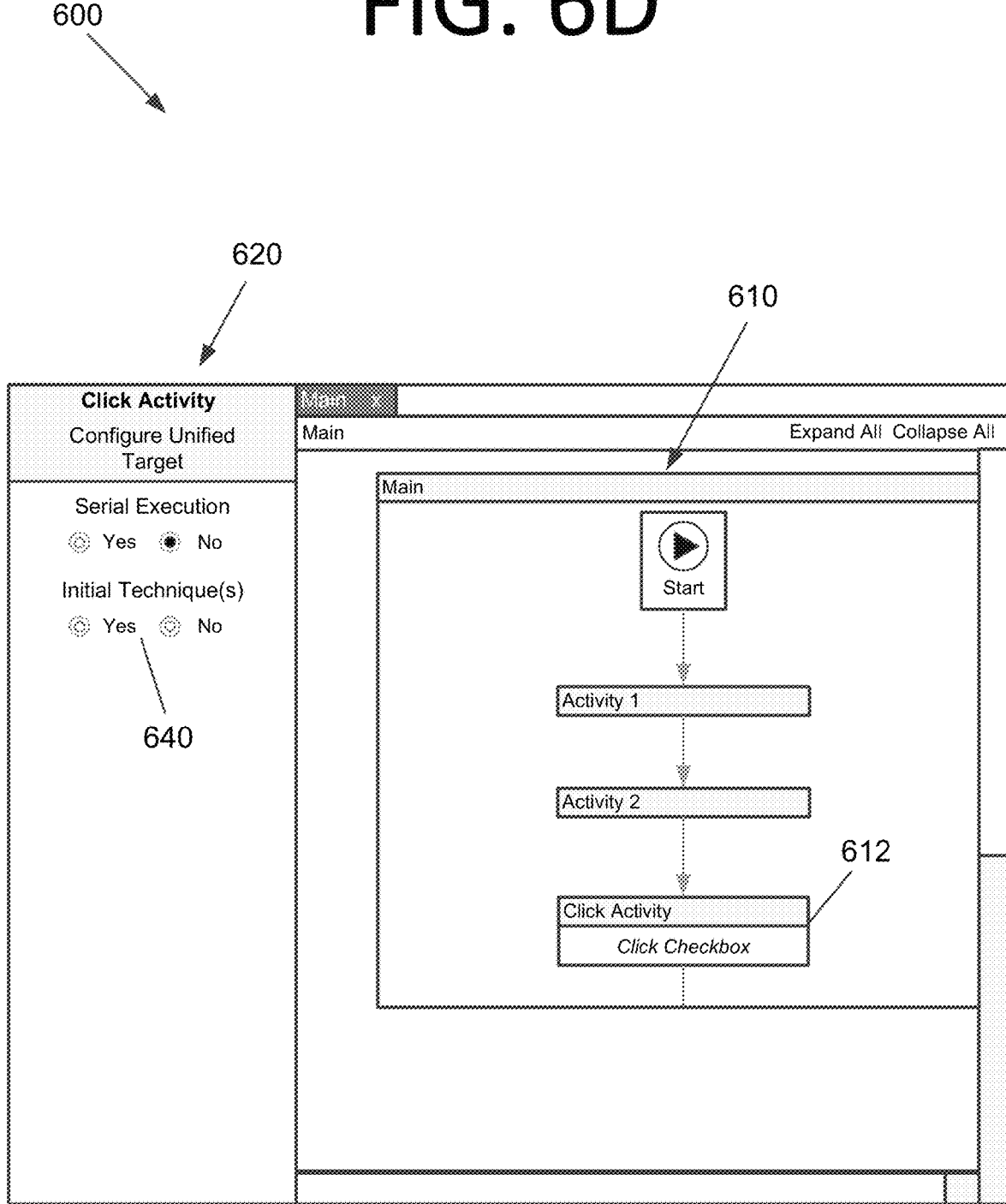
Figure 6E:
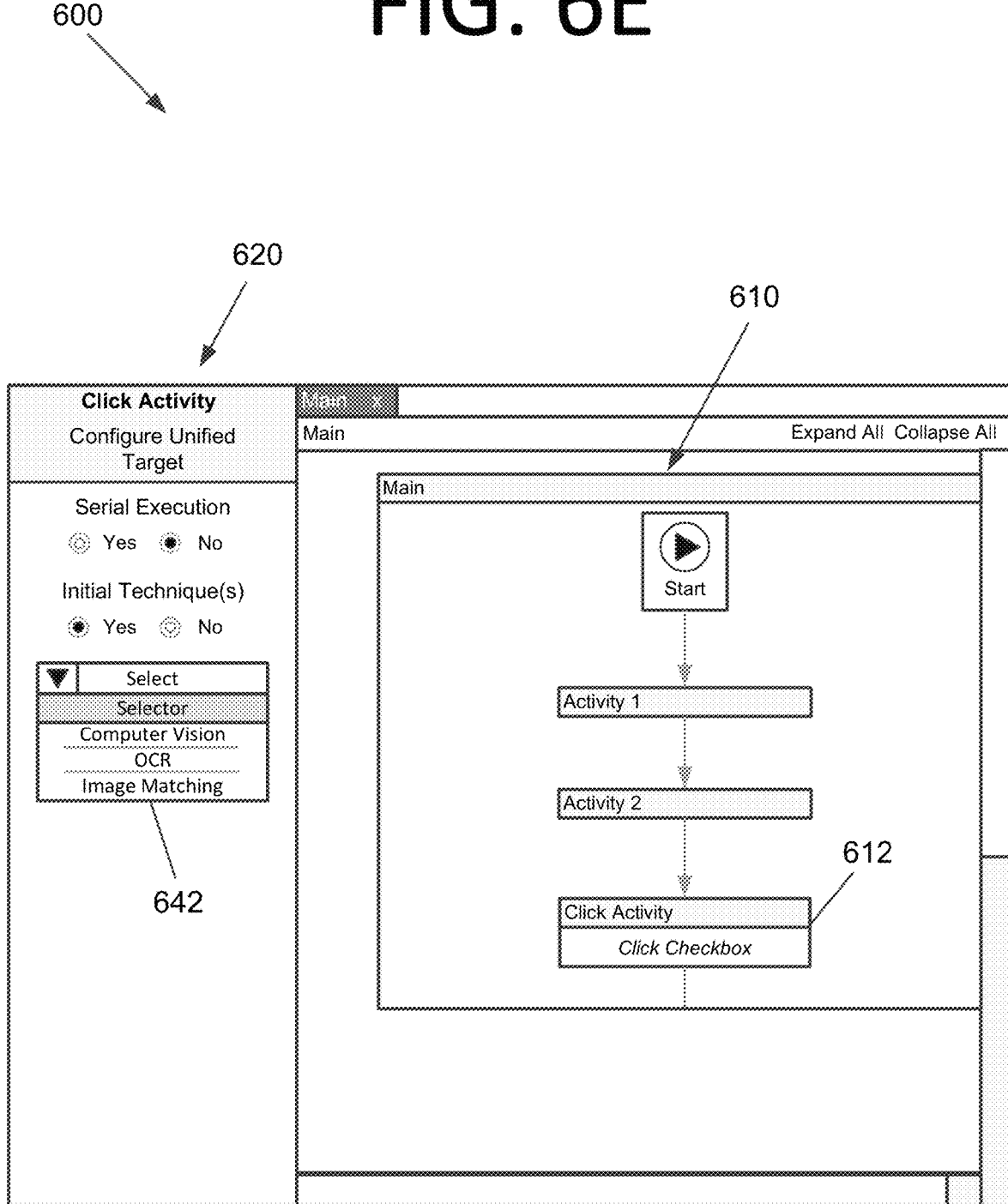
Figure 6F:
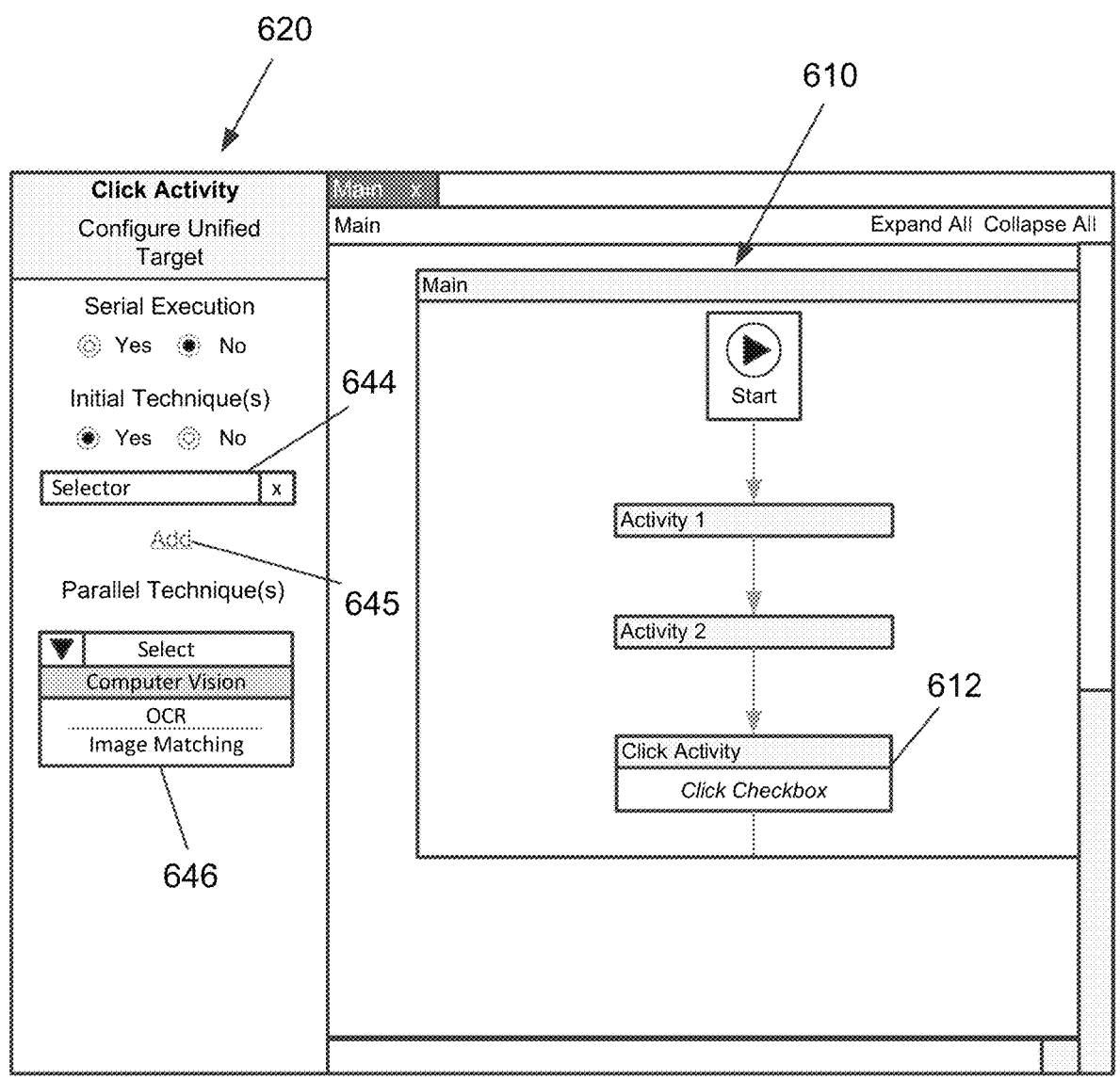
Figure 6G:
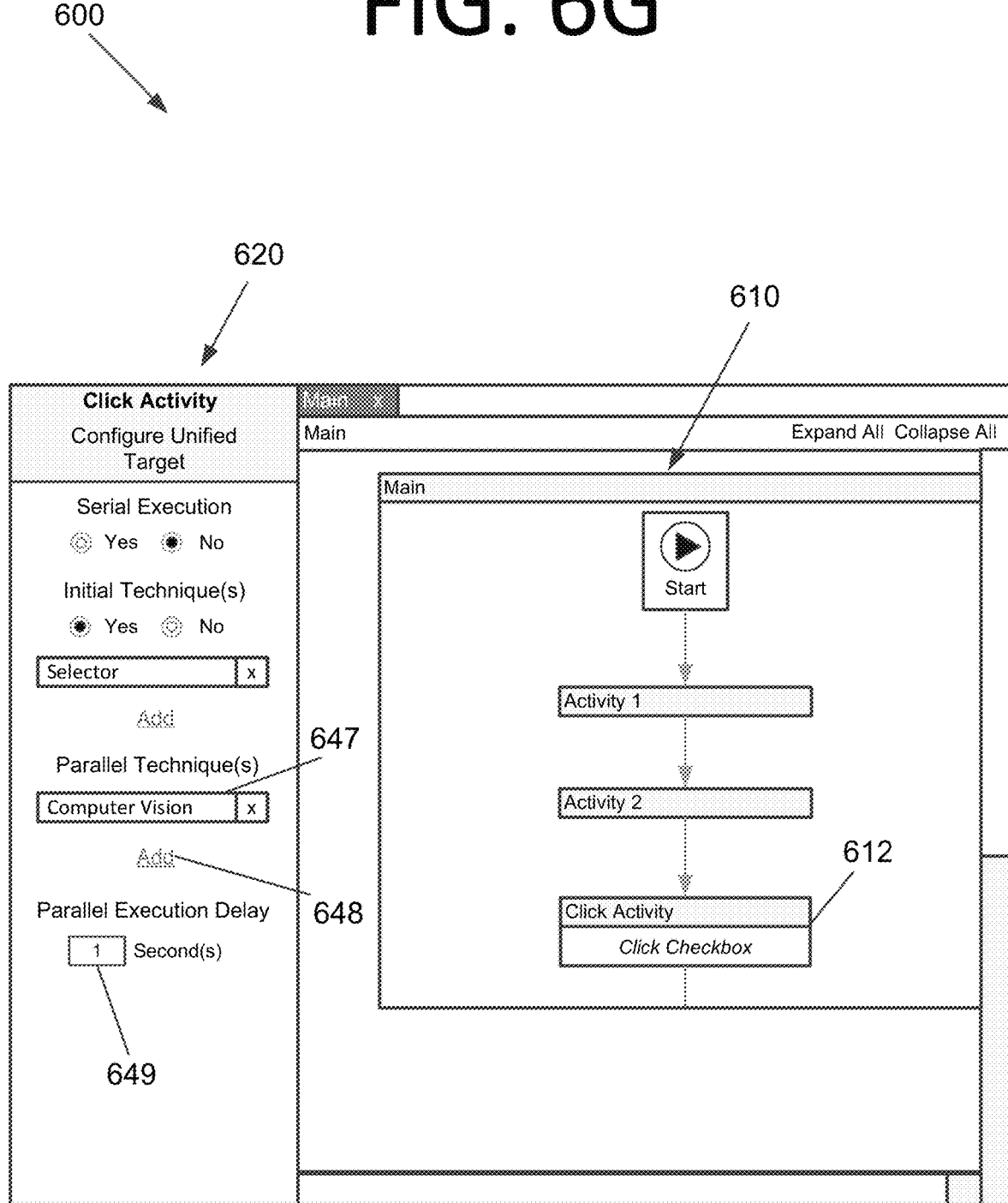

As shown in FIG. 6A, a serial execution selector 630 allows the RPA developer to choose whether the unified target technique for activity 612 will execute in series individually or in parallel with at least one stage of delayed parallel execution. If serial execution is selected, the order of execution of the techniques can be specified using a drop-down 632. See FIG. 6B. Selected technique(s) 634 appear after selection and a timeout for each technique may be specified via a timeout field 636. See FIG. 6C.

If delayed parallel execution is desired, the value of serial execution selector 630 may be set to "No", and the RPA developer can then choose whether one or more initial techniques will be used via initial techniques selector 640. See FIG. 6D. If initial technique selector 640 is set to "No", the graphical element detection techniques for unified target may be executed in parallel. However, if initial techniques selector 640 is set to "Yes", a dropdown 642 for selecting initial techniques appears. See FIG. 6E. However, in some embodiments, one or more initial techniques are automatically executed and may not be configurable by the RPA developer. For instance, a selector-based approach may be faster than the others and may be tried initially. In certain embodiments, one or more default initial techniques may be shown, and the RPA developer may change these (e.g., by adding new techniques, removing default techniques, etc.). In some embodiments, the RPA developer cannot configure the initial technique(s), but can configure the delayed parallel technique(s).

After an initial technique 644 is selected, a parallel techniques dropdown 646 appears with the remaining techniques listed. See FIG. 6F. In some embodiments, the types of graphical element detection techniques are chosen automatically based on the action implemented by the activity (e.g., click, get text, hover, etc.), the graphical element type (e.g., button, text field, etc.), and/or the specific graphical element that is indicated by the RPA developer (i.e., which element the user picked on the screen and what other elements are present in the application). With respect to the specific graphical element, if the RPA developer clicks one OK button, for example, but there are two OK buttons on the screen, some attributes may be automatically added to distinguish between the two otherwise identical OK buttons. When using a UI tree, for instance, the UI tree is usually built in such a way that when an RPA developer indicates a graphical element on the screen, at least some of the attributes in the UI tree are different for that graphical element than for other graphical elements.

The RPA developer may still add more initial techniques via add link 645, or the RPA developer may remove previously selected initial techniques. In some embodiments, if the RPA developer selects "No" for initial techniques selector 640, parallel techniques dropdown 646 still appears and the RPA developer can custom-select which techniques to execute in parallel. After a parallel technique 647 is selected, the RPA developer may still add more parallel techniques via add link 648, or the RPA developer may remove previously selected parallel techniques. See FIG. 6G. A delay for how long to wait to execute the parallel technique(s) after execution of the initial technique(s) begins may be specified via a delay field 649. In some embodiments where a multi-anchor technique is used to identify a target and one or more anchors, the unified target settings may be custom-configured for the target and each anchor, or the same settings may be applied to the target and the anchor(s).

In some embodiments, multiple delay periods may be used. For instance, an initial technique may be used for one second, and if a match is not found, one or more other technique(s) may be used in parallel with the initial technique, and if no match is found during the second period, still other technique(s) may be applied in parallel, etc. Any number of delay periods and/or techniques during each delay period may be used without deviating from the scope of the invention.

In some embodiments, mutually exclusive serial stages may be employed. For instance, an initial technique may be used for one second, and if a match is not found, one or more other technique(s) may be used instead of the initial technique, and if no match is found during the second period, still other technique(s) may be applied instead of the initial technique and the second period technique(s), etc. In this manner, techniques that do not appear to be successful may be stopped, potentially reducing resource requirements.

FIG. 7A illustrates a collapsed targeting method configuration interface 700 for configuring at the application and/or UI type level, according to an embodiment of the present invention. In this embodiment, the user can configure targeting methods for web browsers, Java®, SAP®, a Microsoft® UI Automation (UTA) desktop, an Active Accessibility (AA) desktop, and a Microsoft® Win32 desktop. Each of these applications and/or display types may be individually configured by the user.

Figure 7B:
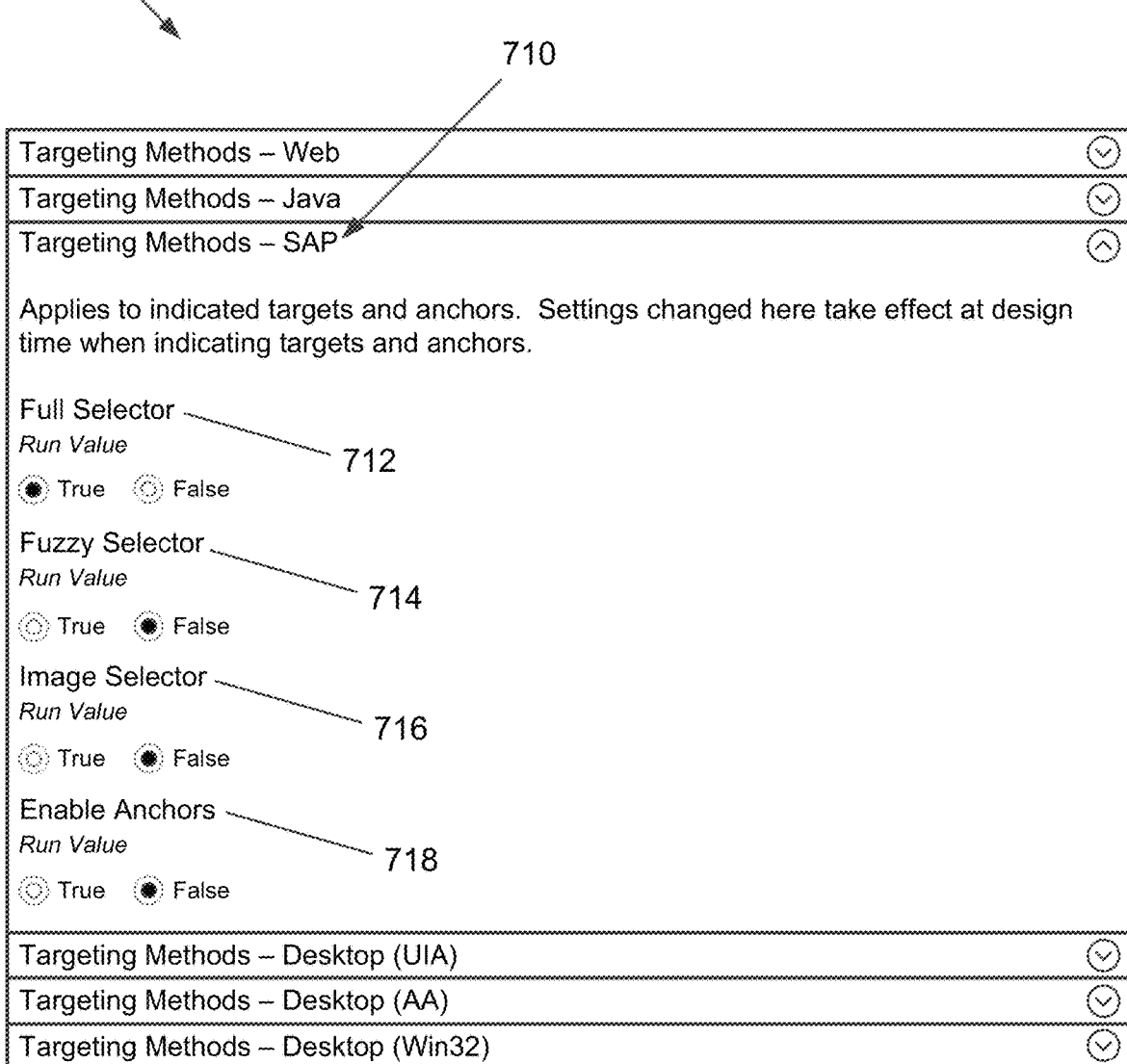

Turning to FIG. 7B, the user has configured default targeting methods for SAP® using SAP® targeting method tab 710. Since SAP® currently has strong and reliable selectors, the run value for full selector 712 is set to "True". The run values for fuzzy selector 714, image selector 716 and enable anchors 718 (i.e., to enable identification of the target using target/anchor functionality) are set to "False".

Figure 7C:
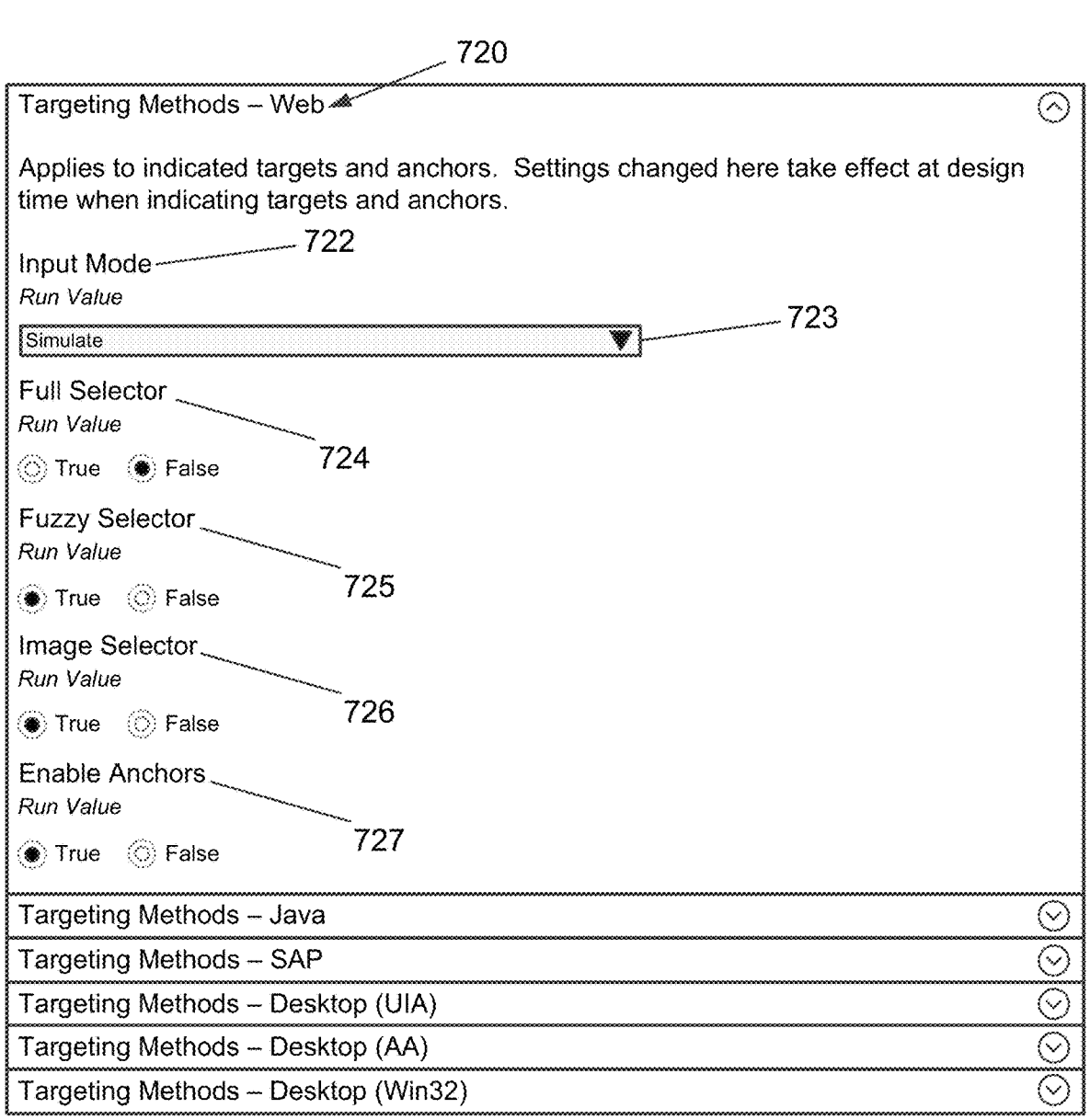

However, this technique may not be effective for all applications and/or UI types. For instance, selectors may not work well for many modern web browsers since values for the attributes tend to change dynamically. Turning to FIG. 7C, the user has configured default targeting methods for web browsers using web targeting method tab 720. Input mode 722 is set to "Simulate" via a dropdown menu 723. This is a web-specific setting, and other application and/or UI type-specific settings for web applications and/or other applications/UI types may be included without deviating from the scope of the invention. When applications are automated in some embodiments, different mechanisms for interacting with an application (e.g., providing mouse clicks, key presses, etc.) may be used. "Simulate" simulates the input that the web browser would receive from the system were a user to perform a similar interaction.

Because using a full selector is not accurate for many web browsers, the run value for full selector setting 724 is set to "False". On the other hand, the run values for fuzzy selector 725, image selector 726, and enable anchors 727 are set to "True". This is the opposite configuration as in SAP® targeting method tab 710 in FIG. 7B.

By configuring targeting methods on a per-application and/or per-UI type basis, a user does not need to reconfigure every graphical element when he or she indicates the element on the screen. For instance, if the user indicates a text field in a web browser, the targeting methods for that text field will be as the user preconfigured them without the user having to go in each time and set the run value for the full selector to "False", set the run value for fuzzy selector to "True", etc. However, it should be noted that the user may modify these default values in some embodiments if there is a specific UI element that may be detected more accurately using a different targeting method configuration than the default configuration.

It should be noted that other targeting method settings are possible. For instance, CV, OCR, or a combination thereof may be used in some embodiments. Indeed, any suitable graphical element detection technique(s) may be used without deviating from the scope of the invention.

Figure 8:
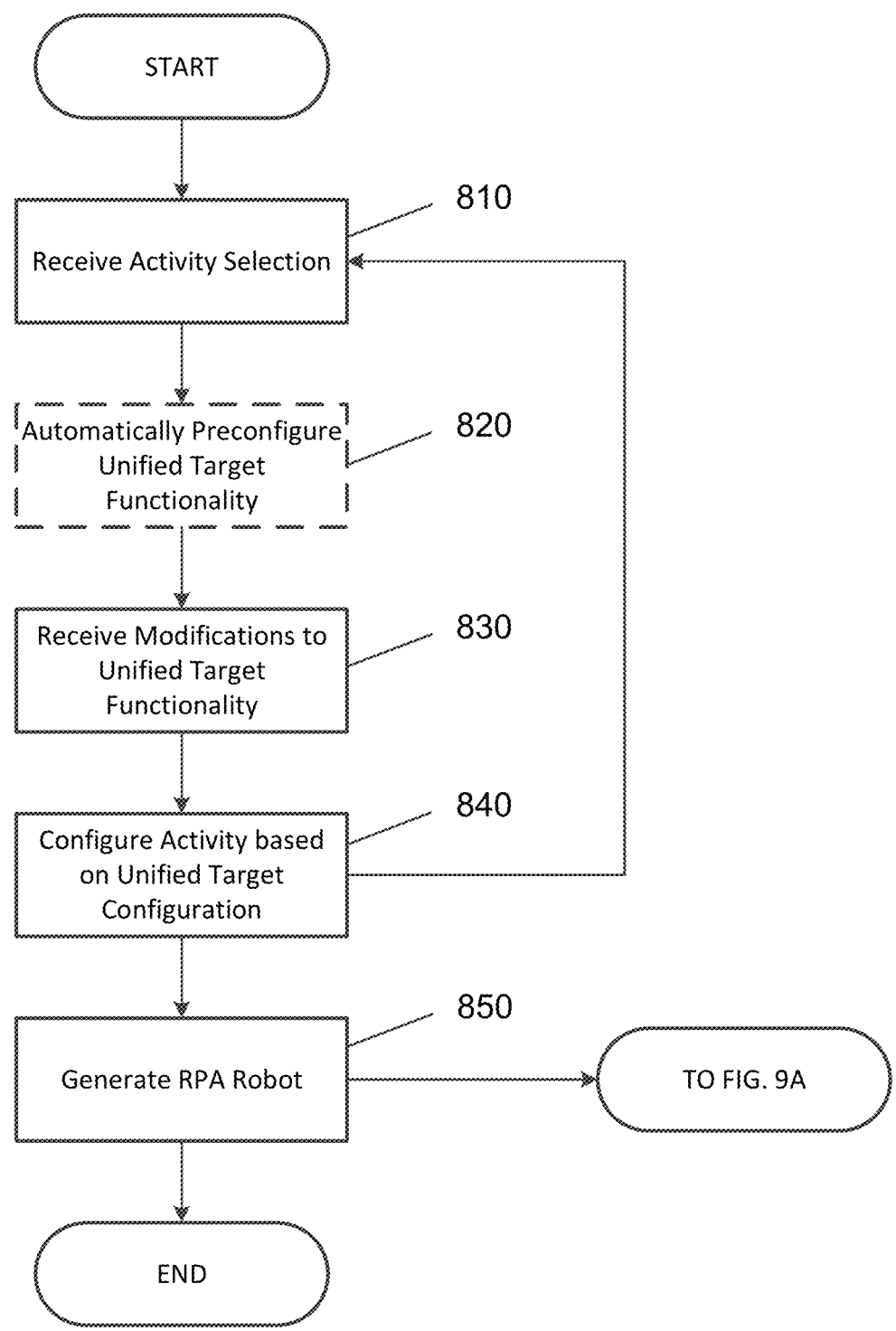
FIG. 8 is a flowchart illustrating a process for configuring unified target functionality for activities in an RPA workflow, according to an embodiment of the present invention.

FIG. 8 is a flowchart illustrating a process 800 for configuring unified target functionality for activities in an RPA workflow, according to an embodiment of the present invention. In some embodiments, process 800 may be performed by RPA designer application 600 of FIGS. 6A-G. The process begins with receiving a selection of an activity in an RPA workflow at 810 to be configured to perform graphical element detection using unified target. In some embodiments, the unified target functionality is automatically preconfigured at 820. In certain embodiments, this preconfiguring may be based on the types of graphical element detection techniques, the graphical element type, and/or the specific graphical element that is indicated by the RPA developer.

The RPA designer application may receive modifications to the unified target functionality from the RPA developer at 830 in order to custom-configure the unified target functionality for the activity. The RPA designer application then configures the activity based on the unified target configuration at 840. If more activities are to be configured, the RPA developer may select another activity and the process returns to step 810. Once the desired activit(ies) are configured, the RPA designer application generates an RPA robot to implement an RPA workflow including the configured activit(ies) at 850. The process then ends or proceeds to FIG. 9A.

Figure 9B:
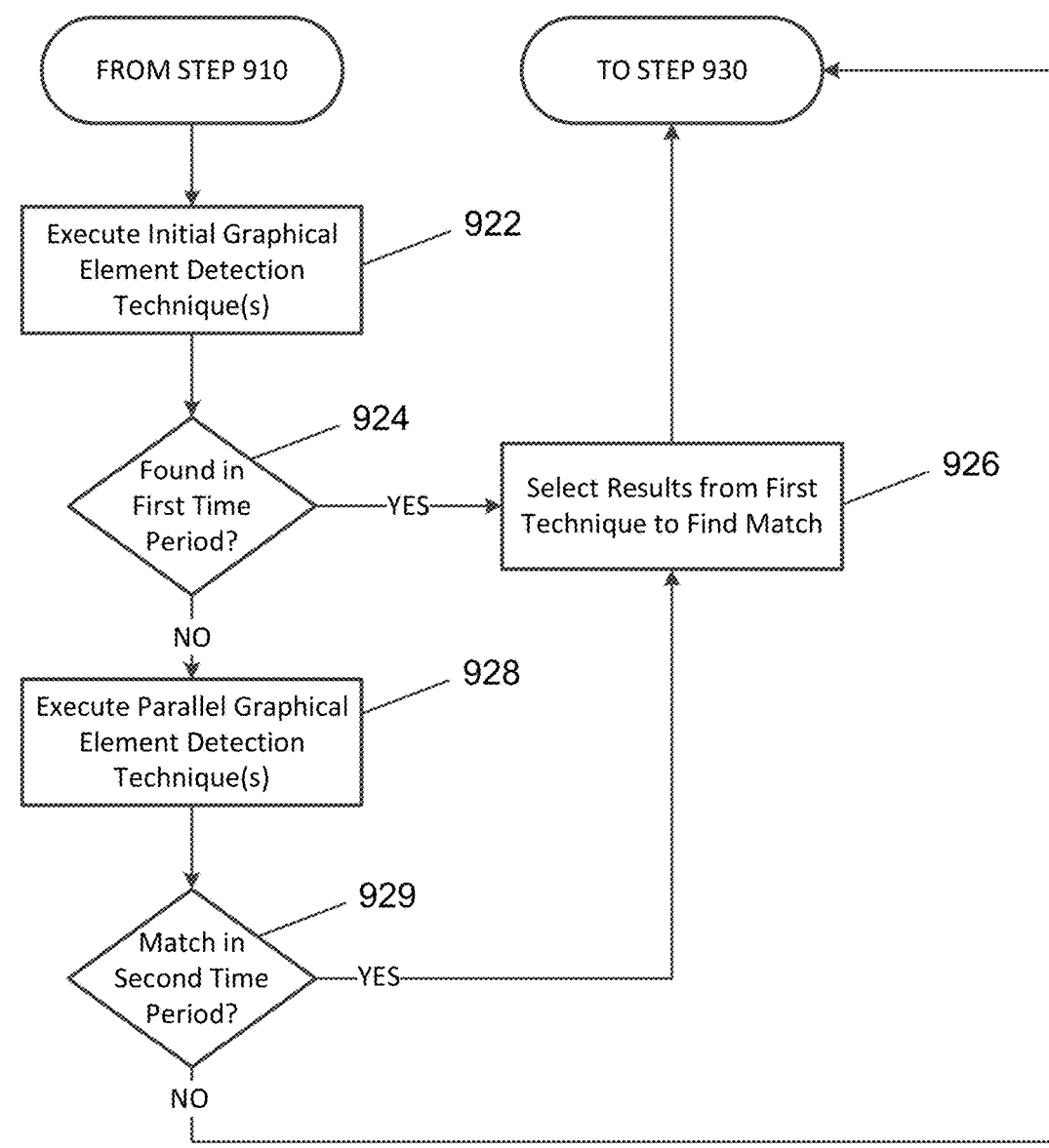

FIGS. 9A and 9B are flowcharts illustrating a process 900 for graphical element detection using a combined series and delayed parallel execution unified target technique, according to an embodiment of the present invention. In some embodiments, process 900 may be implemented at runtime by an RPA robot created via RPA designer application 600 of FIGS. 6A-G. The process begins with analyzing a UI (e.g., a screenshot, an image of an application window, etc.) to identify UI element attributes at 910. The UI element attributes may include, but are not limited to, images, text, relationships between graphical elements, a hierarchical representation of the graphical elements in the UI, etc. The identification may be performed via CV, OCR, API calls, analysis of text files (e.g., HTML, XML, etc.), a combination thereof, etc.

After the UI has been analyzed, the UI element attributes are analyzed for the activity using unified target at 920. Turning to FIG. 9B, one or more initial graphical element detection techniques are executed (potentially in parallel) at 922. If a match is found in a first time period at 924 for the initial technique(s) (e.g., within a tenth of a second, one second, ten seconds, etc.), the results from this match are selected at 926.

If a match is not found in the initial technique time period at 924, one or more additional graphical element detection techniques are executed in parallel at 928. If a match is found in a second time period at 929, the results from the first technique to find a match out of all of the initial techniques and subsequent parallel techniques are then selected at 926 and the process proceeds to step 930. In some embodiments, finding a match for the graphical element may involve finding a match for the graphical element itself as a target and for its anchor(s), and the first technique to find a match for each may be selected for that respective target/anchor. If a match was not found in the second time period at 929, the process also proceeds to step 930. In some embodiments, multiple stages of delayed parallel execution are performed. In certain embodiments, different techniques are executed at each stage and previous techniques are stopped.

If a matching UI element is found via unified target at 930, the action associated with the activity involving the UI element is performed at 940 (e.g., clicking a button, entering text, interacting with a menu, etc.). If there are more activities at 950, the process proceeds to step 920 for the next activity. If, however, the UI element matching the attributes of the graphical element detection techniques is not found at 930, an exception is thrown or the user is asked how he or she would like to proceed (e.g., whether to continue execution) at 960 and the process ends.

Figure 10A:
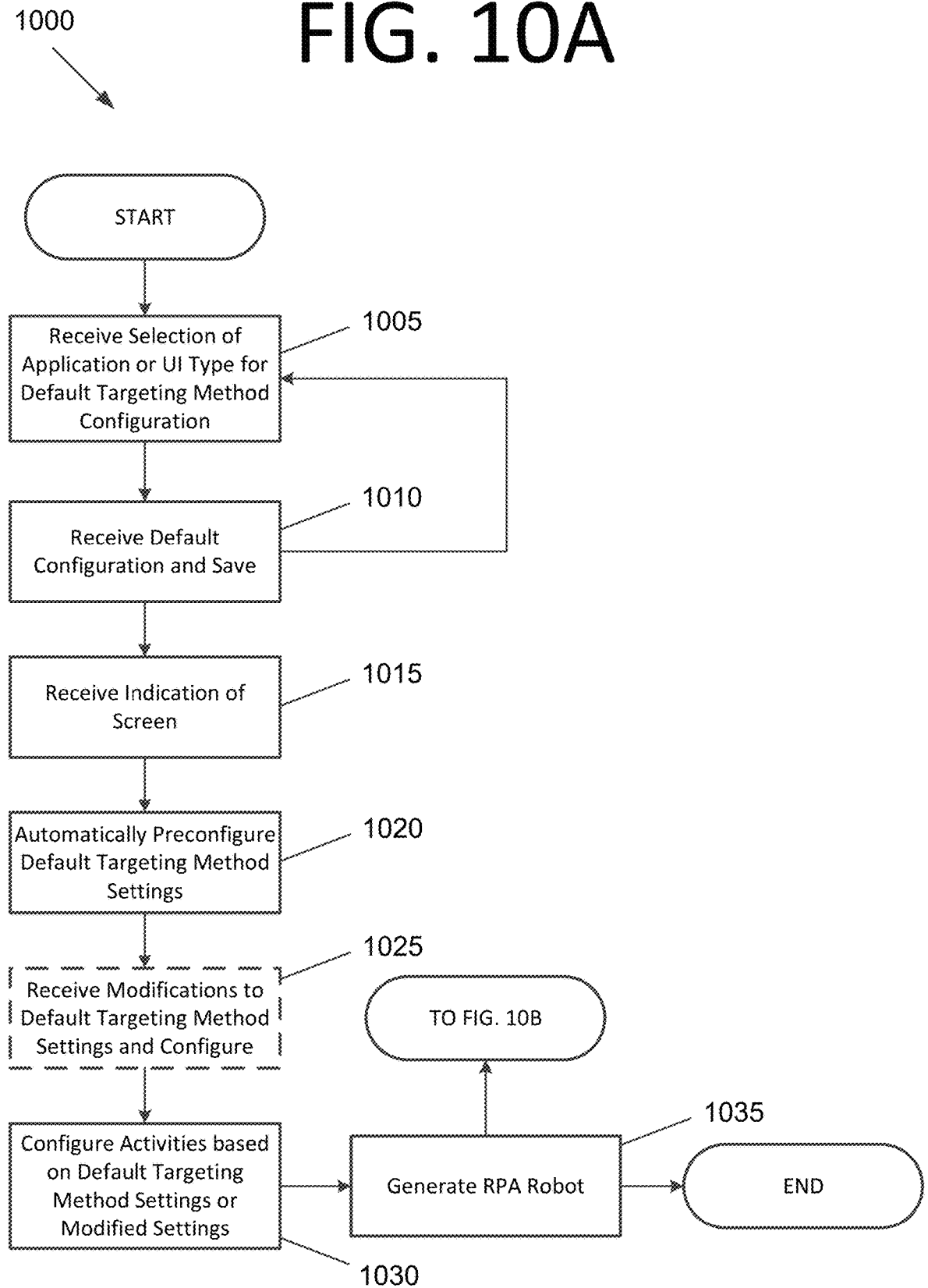
FIGS. 10A and 10B are flowcharts illustrating a design time portion and a runtime portion, respectively, of a process for configuring default graphical element detection techniques and performing graphical element detection at an application and/or UI type level, according to an embodiment of the present invention.
Figure 10B:
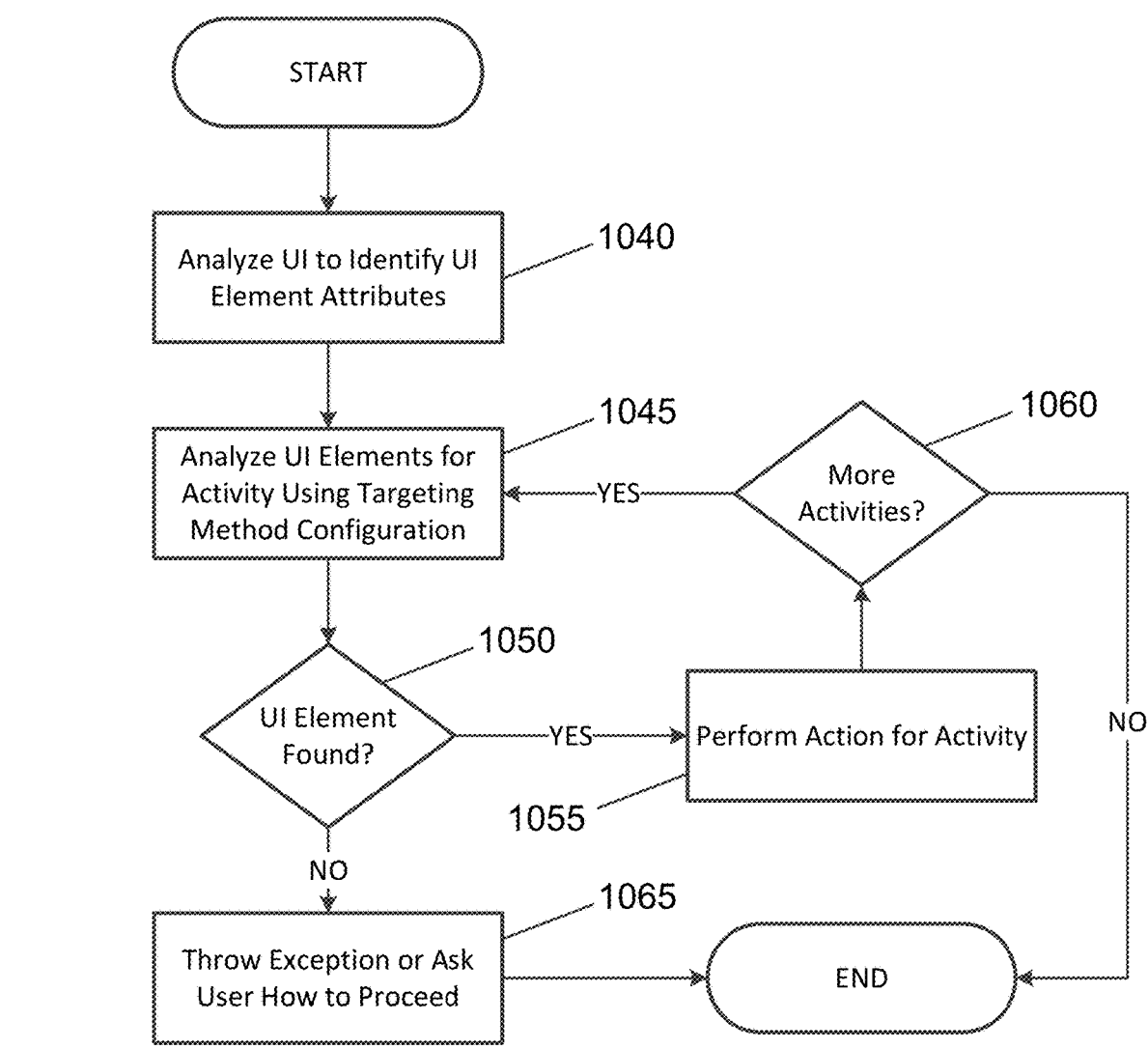

FIGS. 10A and 10B are flowcharts illustrating a design time portion and a runtime portion, respectively, of a process 1000 for configuring graphical element detection techniques and performing graphical element detection at an application and/or UI type level, according to an embodiment of the present invention. In some embodiments, the design time portion of process 1000 may be performed by targeting method configuration interface 700 of FIGS. 7A-C. The process begins with receiving a selection of an application or a UI type for default targeting method configuration at 1005. A developer then configures the default targeting method settings (e.g., for a web browser, the Win32 desktop, etc.), and this default configuration is received and saved at 1010. The default configuration may be saved in a UI object repository in some embodiments where it can be accessed by multiple or many users. The user may then select another application or a UI type for default targeting method configuration, if desired.

The same developer or a different developer then indicates a screen in a UI, and the screen indication is received at 1015 (e.g., by an RPA designer application such as UiPath Studio™). In other words, different instances of the RPA designer application may be used to configure the default targeting method settings and to subsequently modify the default targeting method settings. Indeed, these instances may not be on the same computing system in some embodiments. The default targeting method settings are then pre-configured for the detected application or UI type associated with the screen at 1020. The RPA designer application may receive modifications to the default targeting method settings and configure the settings accordingly at 1025. For instance, a user may choose which targeting methods he or she wants to use for a screen where the default techniques are not performing as well as desired. For example, perhaps a certain screen has substantially different visual features than other screens in the application or desktop.

After the targeting method settings have been set by default or modified from the default configuration, the user develops an RPA workflow where the activities are configured using these targeting method settings at 1030. In some embodiments, the user may still modify the default targeting method settings while designing the RPA workflow. After the user has completed the RPA workflow, the RPA designer application generates an RPA robot to implement the RPA workflow including the configured activit(ies) at 1035. The process then ends or proceeds to FIG. 10B.

Turning to FIG. 10B, a UI (e.g., a screenshot, an image of an application window, etc.) is analyzed to identify UI element attributes at 1040. The UI element attributes may include, but are not limited to, images, text, relationships between graphical elements, a hierarchical representation of the graphical elements in the UI, etc. The identification may be performed via CV, OCR, API calls, analysis of text files (e.g., HTML, XML, etc.), a combination thereof, etc.

After the UI has been analyzed, the UI element attributes are analyzed for the activity using the default targeting method configuration(s) at 1045, unless overridden for a given UI element by the user during design time development. If a matching UI element is found using the targeting method settings at 1050, the action associated with the activity involving the UI element is performed at 1055 (e.g., clicking a button, entering text, interacting with a menu, etc.). If there are more activities at 1060, the process proceeds to step 1045 for the next activity. If, however, the UI element is not found using the configured targeting method(s) at 1050, an exception is thrown or the user is asked how he or she would like to proceed (e.g., whether to continue execution) at 1065 and the process ends.

The process steps performed in FIGS. 8-10B may be performed by a computer program, encoding instructions for the processor(s) to perform at least part of the process(es) described in FIGS. 8-10B in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 8-10B, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program, the computer program configured to cause at least one processor to:

analyze a user interface (UI) at runtime to identify UI element attributes for one or more UI elements;

compare the UI element attributes to UI descriptor attributes for an activity of a robotic process automation (RPA) workflow using one or more initial graphical element detection techniques; and when a match is not found using the one or more initial graphical element detection techniques during a first time period:

execute one or more additional graphical element detection techniques in parallel with the one or more initial graphical element detection techniques.

2. The non-transitory computer-readable medium of claim 1, wherein when a match is not found using the one or more initial graphical element detection techniques and the one or more additional graphical element detection techniques during a second time period, the computer program is further configured to cause the at least one processor to:

execute one or more supplemental graphical element detection techniques in parallel with the one or more initial graphical element detection techniques and the one or more additional graphical element detection techniques.

3. The non-transitory computer-readable medium of claim 1, wherein when a match is found, the computer program is further configured to cause the at least one processor to:

take an action associated with the activity involving a UI element of the one or more UI elements.

4. The non-transitory computer-readable medium of claim 1, wherein the steps of claim 1 are repeated for at least one additional activity.

5. The non-transitory computer-readable medium of claim 1, wherein the UI descriptor attributes comprise two or more of selector attributes, computer vision (CV) attributes, image matching attributes, and optical character recognition (OCR) attributes.

6. The non-transitory computer-readable medium of claim 1, wherein the computer program comprises an RPA robot.

7. The non-transitory computer-readable medium of claim 1, wherein the first time period is predefined.

8. The non-transitory computer-readable medium of claim 1, wherein the computer program is further configured to cause the at least one processor to:

select a first result determined by a match from a first graphical element detection technique of the one or more initial graphical element detection techniques and the one or more additional graphical element detection techniques, the first result identifying a UI element of the one or more UI elements; and take an action associated with the activity involving the UI element.

9. A computer-implemented method, comprising:

comparing, by a robotic process automation (RPA) robot executing on a computing system, user interface (UI)

element attributes for one or more UI elements to UI descriptor attributes for an activity performed by the RPA robot from a workflow of the RPA robot using one or more initial graphical element detection techniques; and when a match is not found using the one or more initial graphical element detection techniques during a predefined first time period:

executing, by the RPA robot, one or more additional graphical element detection techniques in parallel with the one or more initial graphical element detection techniques.

10. The computer-implemented method of claim 9, further comprising:

selecting, by the RPA robot, a first result determined by a match from a first graphical element detection technique of the one or more initial graphical element detection techniques and the one or more additional graphical element detection techniques, the first result identifying a UI element of the one or more UI elements; and taking an action associated with the activity involving the UI element, by the RPA robot.

11. The computer-implemented method of claim 9, wherein when a match is not found using the one or more initial graphical element detection techniques and the one or more additional graphical element detection techniques during a second time period, the method further comprises:

executing, by the RPA robot, one or more supplemental graphical element detection techniques in parallel with the one or more initial graphical element detection techniques and the one or more additional graphical element detection techniques.

12. The computer-implemented method of claim 9, wherein when a match is found, the method further comprises:

taking an action associated with the activity involving a UI element of the one or more of the UI elements, by the RPA robot.

13. The computer-implemented method of claim 9, wherein the method of claim 9 is repeated for at least one additional activity.

14. The computer-implemented method of claim 9, wherein the UI descriptor attributes comprise two or more of selector attributes, computer vision (CV) attributes, image matching attributes, and optical character recognition (OCR) attributes.

15. The computer-implemented method of claim 9, further comprising:

analyzing, by the RPA robot, a UI at runtime to identify the UI element attributes.

16. A computing system, comprising:
memory storing computer program instructions; and
at least one processor configured to execute the computer program instructions, wherein the computer program instructions are configured to cause at least one processor to:

compare user interface (UI) element attributes for one or more UI elements to UI descriptor attributes for an activity of a robotic process automation (RPA) workflow using one or more initial graphical element detection techniques; and when a match is not found using the one or more initial graphical element detection techniques during a predefined first time period:

execute one or more additional graphical element detection techniques in parallel with the one or more initial graphical element detection techniques, select a first result determined by a match from a first graphical element detection technique of the one or more initial graphical element detection techniques and the one or more additional graphical element detection techniques, the first result identifying a UI element of the one or more UI elements; and take an action associated with the activity involving the UI element.

17. The computing system of claim 16, wherein when a match is not found using the one or more initial graphical element detection techniques and the one or more additional graphical element detection techniques during a second time period, the computer program instructions are further configured to cause the at least one processor to:

execute one or more supplemental graphical element detection techniques in parallel with the one or more initial graphical element detection techniques and the one or more additional graphical element detection techniques.

18. The computing system of claim 16, wherein the computer program instructions comprise an RPA robot.

19. The computing system of claim 16, wherein the steps of claim 16 are repeated for at least one additional activity.

20. The computing system of claim 16, wherein the UI descriptor attributes comprise two or more of selector attributes, computer vision (CV) attributes, image matching attributes, and optical character recognition (OCR) attributes.

* * * * *